US011910288B2

(12) United States Patent
Yamamoto et al.

(10) Patent No.: US 11,910,288 B2
(45) Date of Patent: Feb. 20, 2024

(54) INTEGRATED CIRCUIT FOR TRANSMITTING A PUCCH REPETITION SIGNAL USING A CHANNEL FORMAT THAT ACCOMMODATES SRS TRANSMISSION

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 319 days.

(21) Appl. No.: 17/354,637

(22) Filed: Jun. 22, 2021

(65) Prior Publication Data

US 2021/0320696 A1 Oct. 14, 2021

Related U.S. Application Data

(63) Continuation of application No. 16/570,457, filed on Sep. 13, 2019, now Pat. No. 11,082,112, which is a
(Continued)

(30) Foreign Application Priority Data

Jul. 28, 2015 (JP) .................. 2015-148545

(51) Int. Cl.
*H04L 27/26* (2006.01)
*H04W 4/70* (2018.01)
(Continued)

(52) U.S. Cl.
CPC .............. *H04W 4/70* (2018.02); *H04B 7/066* (2013.01); *H04J 13/004* (2013.01); *H04J 13/18* (2013.01);
(Continued)

(58) Field of Classification Search
CPC ......... H04L 1/08; H04L 1/1671; H04L 5/001; H04L 5/0048; H04L 5/0051;
(Continued)

(56) References Cited

U.S. PATENT DOCUMENTS

2012/0287900 A1 11/2012 Seo et al.
2014/0010182 A1* 1/2014 Chunli .................. H04L 5/0053
370/329
(Continued)

OTHER PUBLICATIONS

3GPP TS 36.211, V12.5.0, "3rd Generation Partnership Project; Technical Specification Group Radio Access Network; Evolved Universal Terrestrial Radio Access (E-UTRA); Physical channels and modulation (Release 12)", Mar. 2015.
(Continued)

*Primary Examiner* — Brandon M Renner
(74) *Attorney, Agent, or Firm* — Seed IP Law Group LLP

(57) ABSTRACT

A repeater generates repetition signals by repeating an uplink signal over a plurality of subframes. If the plurality of subframes do not include a transmission candidate subframe of a sounding reference signal used to measure uplink reception quality, a controller sets a first transmission format to all the plurality of subframes, and if the plurality of subframes include the transmission candidate subframe, the controller sets a second transmission format to all the plurality of subframes. A transmitter transmits the repetition signals using the set transmission format.

10 Claims, 14 Drawing Sheets

Related U.S. Application Data continuation of application No. 15/653,154, filed on Jul. 18, 2017, now Pat. No. 10,455,390, which is a continuation of application No. PCT/JP2016/001293, filed on Mar. 9, 2016.

(51) Int. Cl.
| | |
|---|---|
| *H04L 5/00* | (2006.01) |
| *H04B 7/06* | (2006.01) |
| *H04W 72/20* | (2023.01) |
| *H04J 13/00* | (2011.01) |
| *H04J 13/18* | (2011.01) |
| *H04L 1/08* | (2006.01) |

(52) U.S. Cl.
CPC ............... *H04L 1/08* (2013.01); *H04L 5/001* (2013.01); *H04L 5/0051* (2013.01); *H04L 5/0062* (2013.01); *H04L 27/2602* (2013.01); *H04L 27/26035* (2021.01); *H04L 27/2643* (2013.01); *H04W 72/20* (2023.01)

(58) Field of Classification Search
CPC . H04L 5/0062; H04L 5/0094; H04L 25/0204; H04L 25/0224; H04W 4/70; H04W 72/20; H04B 7/066; H04J 13/004; H04J 13/18

See application file for complete search history.

(56) References Cited

U.S. PATENT DOCUMENTS

| | | | |
|---|---|---|---|
| 2014/0112168 A1 | 4/2014 | Chen et al. | |
| 2014/0126510 A1* | 5/2014 | Ogawa | H04L 5/0048 370/329 |
| 2014/0219126 A1* | 8/2014 | Li | H04W 52/50 370/252 |
| 2016/0226639 A1* | 8/2016 | Xiong | H04L 5/0053 |
| 2018/0213525 A1 | 7/2018 | Nan et al. | |

OTHER PUBLICATIONS

3GPP TS 36.212, V12.4.0, "3rd Generation Partnership Project; Technical Specification Group Radio Access Network; Evolved Universal Terrestrial Radio Access (E-UTRA); Multiplexing and channel coding (Release 12)", Mar. 2015.

3GPP TS 36.213, V12.5.0, "3rd Generation Partnership Project; Technical Specification Group Radio Access Network; Evolved Universal Terrestrial Radio Access (E-UTRA); Physical layer procedures (Release 12)", Mar. 2015.

3GPP TSG RAN Meeting #65, RP-141660, Ericsson, Nokia Networks, "New WI proposal: Further LTE Physical Layer Enhancements for MTC", Sep. 2014.

3GPP TSG RAN WG1 Meeting #80, R1-150312, Panasonic, "Discussion and performance evaluation on PUSCH coverage enhancement", Feb. 2015.

3GPP TSG RAN WG1 Meeting #80bis, R1-151587, Samsung, "Considerations of legacy SRS impact on uplink transmission from low-cost UE", Apr. 2015.

3GPP TSG RAN WG1 Meeting #81, R1-152703, LG Electronics, "Discussion on PUSCH transmissions for MTC", May 2015.

3GPP TSG RAN WG1 Meeting #80bis, R1-151454, MCC Support, "Final Report of 3GPP TSG RAN WG1 #80 v1.0.0", Apr. 2015.

3GPP TSG RAN WG1 Meeting #81, R1-152528, "LS Out on Additional Aspects for MTC", May 2015.

International Search Report of PCT application No. PCT/JP2016/001293 dated Apr. 26, 2016. (With English Translation).

LG Electronics, "Details on SR repetition and SRS transmission for MTC UE", R1-152705, 3GPP TSG RAN WG1 Meeting #81, Agenda Item: 6.2.1.5, Fukuoka, Japan, May 25-29, 2015, XP050973724, Retrieved from the Internet: URL:http://www.3gpp.org/ftp/tsg_ran/WG1_RL1/TSGR1_81/Docs/ [retrieved on May 16, 2015].

Seigo Nakao et al., "Performance enhancement of E-UTRA uplink control channel in fast fading environments", Proceeding of 2009 IEEE 69th Vehicular Technology Conference (VTC2009—Spring), Apr. 2009.

The Extended European Search Report dated Jun. 29, 2018 for the related European Patent Application No. 16829976.6-1219 / 3331298, 9 pages.

* cited by examiner

FIG. 4

| srs-SubframeConfig | BINARY | CONFIGURATION PERIOD $T_{SFC}$ (SUBFRAMES) | TRANSMISSION OFFSET $\Delta_{SFC}$ (SUBFRAMES) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | RESERVED | RESERVED |

INTEGRATED CIRCUIT FOR TRANSMITTING A PUCCH REPETITION SIGNAL USING A CHANNEL FORMAT THAT ACCOMMODATES SRS TRANSMISSION

BACKGROUND

1. Technical Field

The present disclosure relates to a base station, a terminal, a reception method, and a transmission method.

2. Description of the Related Art

In the 3rd Generation Partnership Project Long Term Evolution (3GPP LTE), orthogonal frequency-division multiple access (OFDMA) is adopted as a communication method for downlink from a base station (also referred to as "Evolved Node B (eNB)") to a terminal (also referred to as "user equipment (UE)"). Single-carrier frequency-division multiple access (SC-FDMA) is adopted as a communication method for uplink from a terminal to a base station (e.g., refer to 3GPP TS 36.211 V12.5.0, "Evolved Universal Terrestrial Radio Access (E-UTRA); Physical channels and modulation (Release 12)," March 2015, 3GPP TS 36.212 V12.4.0, "Evolved Universal Terrestrial Radio Access (E-UTRA); Multiplexing and channel coding (Release 12)," March 2015, and 3GPP TS 36.213 V12.5.0, "Evolved Universal Terrestrial Radio Access (E-UTRA); Physical layer procedures (Release 12)," March 2015).

In LTE, a base station performs communication by assigning resource blocks (RBs) in a system band to a terminal in each time unit called a "subframe". FIG. 1 illustrates an example of the configuration of a subframe in a physical uplink shared channel (PUSCH) of LTE. As illustrated in FIG. 1, a subframe consists of two time slots. In each slot, a plurality of SC-FDMA data symbols and a demodulation reference signal (DMRS) are time-multiplexed. The base station receives the PUSCH and performs channel estimation using the DMRS. Thereafter, the base station demodulates and decodes the SC-FDMA data symbols using a result of the channel estimation.

In addition, in LTE, a hybrid automatic repeat request (HARQ) is applied to downlink data. That is, the terminal feeds back a response signal indicating a result of error detection performed on downlink data. The terminal performs a cyclic redundancy check (CRC) on the downlink data and feeds back, to the base station, an acknowledgement (ACK) if there is no error in a result of calculation of the CRC or a negative acknowledgement (NACK) if there is an error in the result of the calculation of the CRC. In the feedback of the response signal (that is, the ACK/NACK signal), an uplink control channel such as a physical uplink control channel (PUCCH) is used.

In LTE, as illustrated in FIG. 2, a plurality of ACK/NACK signals transmitted from a plurality of terminals are spread by a zero autocorrelation (ZAC) sequence having a Zero Auto-correlation characteristic along a time domain (multiplied by the ZAC sequence) and code-multiplexed in the PUCCH. In FIG. 2, (W(0), W(1), W(2), W(3)) indicates a Walsh sequence having a sequence length of 4, and (F(0), F(1), F(2)) indicates a discrete Fourier transform (DFT) sequence having a sequence length of 3.

As illustrated in FIG. 2, in the terminal, the ACK/NACK signal is first subjected to primary spreading by the ZAC sequence (a sequence length of 12) along a frequency domain and spread into a frequency component corresponding to one SC-FDMA symbol. That is, the ZAC sequence having a sequence length of 12 is multiplied by an ACK/NACK signal component represented by a complex number. Next, the ACK/NACK signal subjected to the primary spreading and the ZAC sequence as reference signals are subjected to secondary spreading by the Walsh sequence (a sequence length of 4: W(0) to W(3)) and the DFT sequence (a sequence length of 3: F(0) to F(2)), respectively. That is, each component of the signal having a sequence length of 12 (the ACK/NACK signal subjected to the primary spreading or the ZAC sequence as the reference signals) is multiplied by each component of an orthogonal code sequence (orthogonal cover codes (OCCs); the Walsh sequence or the DFT sequence). Furthermore, the signal subjected to the secondary spreading is transformed into a signal having a sequence length of 12 along the time domain through an inverse discrete Fourier transform (IDFT; or an inverse fast Fourier transform (IFFT)). A cyclic prefix (CP) is then added to the signal subjected to the IFFT, and a signal of one slot including seven SC-FDMA symbols is formed.

In addition, as illustrated in FIG. 3, the PUCCH is assigned to each terminal in units of subframes.

ACK/NACK signals from different terminals are spread (multiplied) using ZAC sequences defined by different cyclic shift indices or orthogonal code sequences corresponding to different orthogonal cover (OC) indices. The orthogonal code sequences are combinations of a Walsh sequence and a DFT sequence. In addition, the orthogonal code sequences are also called "block-wise spreading codes". The base station, therefore, can separate these code-multiplexed ACK/NACK signals by using existing inverse spreading and correlation processes (e.g., refer to Seigo Nakao, Tomofumi Takata, Daichi Imamura, and Katsuhiko Hiramatsu, "Performance enhancement of E-UTRA uplink control channel in fast fading environments," Proceeding of 2009 IEEE 69th Vehicular Technology Conference (VTC2009-Spring), April 2009).

In addition, in LTE uplink, a sounding reference signal (SRS) is used to measure reception quality between the base station and the terminal (e.g., refer to 3GPP TS 36.211 V12.5.0, "Evolved Universal Terrestrial Radio Access (E-UTRA); Physical channels and modulation (Release 12)," March 2015). The terminal transmits the SRS to the base station by mapping the SRS in an SRS resource. Here, the base station sets an SRS resource candidate group including an SRS resource candidate common to all terminals located in a target cell through cell-specific higher layer signaling. Thereafter, an SRS resource, which is a subset of the SRS resource candidate group, is assigned, through higher layer signaling for each terminal, to each of terminals to which the SRS resource is to be assigned. The terminal transmits the SRS to the base station by mapping the SRS in the assigned SRS resource. It is to be noted that each SRS resource candidate is a last SC-FDMA symbol of a subframe with which an SRS can be transmitted (SRS transmission candidate subframe). In addition, all the terminals in the cell to which the SRS resource candidate group has been set do not perform data transmission in symbols that are the SRS resource candidates in order to prevent a collision between an SRS and a data signal (PUSCH signal).

In LTE, a "shortened PUCCH format", in which when an SRS and a PUCCH exist in the same symbols, the PUCCH is spread and orthogonalized over six symbols other than a last symbol of a second slot and then transmitted (e.g., refer to 3GPP TS 36.211 V12.5.0, "Evolved Universal Terrestrial Radio Access (E-UTRA); Physical channels and modulation (Release 12)," March 2015). In the shortened PUCCH format, an ACK/NACK signal subjected to primary spreading is subjected to secondary spreading by a DFT sequence (a sequence length of 3: F(0) to F(2)).

In LTE, srs-SubframeConfig are defined as cell-specific higher layer signaling for setting an SRS resource candidate group (e.g., refer to 3GPP TS 36.211 V12.5.0, "Evolved Universal Terrestrial Radio Access (E-UTRA); Physical channels and modulation (Release 12)," March 2015). FIG. 4 illustrates an example of definitions of srs-SubframeConfig. When the base station transmits srs-SubframeConfig numbers (0 to 15) illustrated in FIG. 4 to the terminal, the base station specifies, to the terminal, a transmission period ($T_{SFC}$) in which an SRS is transmitted an offset ($\Delta_{SFC}$) for specifying a subframe with which transmission of SRSs starts. In FIG. 4, if an srs-SubframeConfig number is 4 (Binary=0100), for example, the transmission period $T_{SFC}$=5 and the offset $\Delta_{SFC}$=1. Second (=1+$\Delta_{SFC}$), seventh (=1+$\Delta_{SFC}$+($T_{SFC}$×1)), twelfth (=1+$\Delta_{SFC}$+($T_{SFC}$×2)), . . . , and (1+$\Delta_{SFC}$+($T_{SFC}$×n))-th subframes, therefore, become SRS transmission candidate subframes (e.g., refer to FIG. 5).

Incidentally, machine-to-machine (M2M) communication that achieves services through autonomous communication between devices without users' determinations has been recently expected as a mechanism for supporting future information societies. One of specific applications of an M2M system is a smart grid. The smart grid is an infrastructure system that efficiently supplies a lifeline such as electricity or gas and autonomously and effectively adjusts supply-demand balance of resources by performing M2M communication between a smart meter provided in each household or building and a central server. Another application of the M2M communication system is a monitoring system for commodity management, environment sensing, telemedicine, or the like, remote management of stocks or charging of vending machines, or the like.

In M2M communication systems, use of cellular systems having wide communication areas is particularly attracting attention. In 3GPP, standardization of improvement of cellular networks for M2M called "machine type communication (MTC)" is underway in standardization of LTE and LTE-Advanced (e.g., refer to RP-141660, Ericsson, Nokia Networks, "New WI proposal: Further LTE Physical Layer Enhancements for MTC," September 2014), and specifications are being examined with the object of cost reduction, reduction in power consumption, and coverage enhancement. Securing coverage is a necessary condition for providing services especially in the case of a terminal that hardly moves, such as a smart meter, unlike in the case of a handset terminal that is usually used by a user who is moving around. "Coverage enhancement (MTC coverage enhancement)" for further enhancing communication areas, therefore, is necessary in order to deal with a case in which an applicable terminal (MTC terminal) is arranged in a place where it is difficult to use the terminal, such as a basement of a building, in current LTE and LTE-Advanced.

In order to further enhance communication areas, a "repetition" technique, in which the same signal is repeatedly transmitted a plurality of times, is being examined in MTC coverage enhancement. In the repetition, reception signal power is improved and coverage (communication area) is enhanced by combining signals subjected to the repetition transmission on a transmission side.

Furthermore, a technique for improving channel estimation accuracy can be used in view of a fact that MTC terminals that require coverage enhancement hardly move and an environment without temporal variation of channels is assumed.

One of techniques for improving the channel estimation accuracy is "cross-subframe channel estimation and symbol level combining" (e.g. refer to R1-150312, Panasonic, "Discussion and performance evaluation on PUSCH coverage enhancement"). In the cross-subframe channel estimation and the symbol level combining, as illustrated in FIG. 6, the base station performs coherent combining on a signal repeatedly transmitted over a plurality of subframes ($N_{Rep}$ subframes) in units of symbols over the same number of subframes as the number of repetitions or fewer subframes (X subframes). Thereafter, the base station performs channel estimation using a DMRS subjected to the coherent combining and demodulates and decodes SC-FDMA data symbols using an obtained result of the channel estimation.

If the number of subframes (X), which is a unit by which the cross-subframe channel estimation and the symbol level combining are performed, is smaller than the number of repetitions ($N_{Rep}$), the base station combines ($N_{Rep}/X$) symbols subjected to the demodulation and the decoding.

It has been found that transmission quality of a PUSCH and a PUCCH can be improved by performing the cross-subframe channel estimation and the symbol level combining, compared with simple repetition in which channel estimation and demodulation and decoding of SC-FDMA data symbols are performed in units of subframes (e.g., refer to R1-150312, Panasonic, "Discussion and performance evaluation on PUSCH coverage enhancement").

SUMMARY

In a cell that supports MTC terminals, the MTC terminals and existing LTE terminals need to coexist, and the MTC terminals are desirably supported in such a way as to minimize an effect upon an existing LTE system. In uplink transmission (e.g., PUSCH transmission) of an MTC terminal (MTC coverage enhancement terminal) that requires repetition transmission, therefore, data transmission is not performed with SRS resource candidates in order to prevent a collision with SRSs of the existing LTE system. As a result, a collision between an SRS and a data signal of the MTC coverage enhancement terminal is prevented.

In PUSCH repetition, there are following two methods as formats used by the terminal to transmit data with SRS transmission candidate subframes.

One is a method in which, as illustrated in FIG. 1, data is mapped in 12 SC-FDMA symbols other than a DMRS and a last SC-FDMA symbol, which is an SRS resource candidate, is punctured (e.g., refer to R1-151587, Samsung, "Considerations of legacy SRS impact on uplink transmission from low-cost UE," April 2015). Because the SRS transmission candidate subframes and the other subframes transmit the same signals in symbols other than the last SC-FDMA symbol in this method, coherent combining can be easily achieved on a base station side.

The other method is a method in which data is mapped in 11 SC-FDMA symbols other than a last SC-FDMA symbol by using a coding rate for data different from those in other subframes as a format for transmitting data with SRS transmission candidate subframes (rate matching) (e.g., refer to R1-152703, LG Electronics, "Discussion on PUSCH transmission for MTC," May 2015). Because this method is used in existing LTE in which repetition transmission is not assumed, a change from an existing standard is not necessary. Because the SRS transmission candidate subframes and the other subframes transmit different signals in each symbol, on the other hand, coherent combining is not performed on the base station side.

On the other hand, in PUCCH repetition, too, as in the case of a PUSCH, there are following two methods as formats used by the terminal to transmit ACK/NACK signals with SRS transmission candidate subframes.

One is a method in which, as illustrated in FIGS. 2 and 3, an ACK/NACK signal and reference signals are mapped using a normal PUCCH format and a last SC-FDMA symbol, which is an SRS resource candidate, is punctured. Because a part of OCCs is punctured in this method, however, orthogonality between OCC sequences collapses, and characteristics might deteriorate due to interference between codes.

The other method is a method in which the shortened PUCCH format is used as a format for transmitting an ACK/NACK signal with an SRS transmission candidate subframe. Because ACK/NACK signals are multiplied by different OCC sequences between the SRS transmission candidate subframes and the other subframes in this method, however, signals before de-spreading are not subjected to coherent combining on the base station side, and a demodulation process in the base station undesirably becomes complicated.

One non-limiting and exemplary embodiment provides a base station, a terminal, a reception method, and a transmission method capable of improving channel estimation accuracy through cross-subframe channel estimation and symbol level combining even if SRS transmission candidate subframes are included.

In one general aspect, the techniques disclosed here feature a terminal including a repeater that generates repetition signals by repeating an uplink signal over a plurality of subframes, a controller that, if the plurality of subframes do not include a transmission candidate subframe of a sounding reference signal used to measure uplink reception quality, sets a first transmission format to all the plurality of subframes and, if the plurality of subframes include the transmission candidate subframe, sets a second transmission format to all the plurality of subframes, and a transmitter that transmits the repetition signals using the set transmission format.

According to an aspect of the present disclosure, the channel estimation accuracy can be improved through the cross-subframe channel estimation and the symbol level combining even if SRS transmission candidate subframes are included.

It should be noted that general or specific embodiments may be implemented as a system, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of definitions of srs-SubframeConfig;

DETAILED DESCRIPTION

Embodiments of the present disclosure will be described in detail hereinafter with reference to the drawings.

Overview of Communication System

A communication system according to each embodiment of the present disclosure includes, for example, a base station 100 and a terminal 200 employing an LTE-Advanced system.

In addition, a case will be assumed in which a terminal 200 (MTC coverage enhancement terminal) to which an MTC coverage enhancement mode is applied exists in a cell of the base station 100. When the MTC coverage enhancement mode is applied, for example, the terminal 200 employs the above-described technique for improving channel estimation accuracy.

In addition, in MTC, whose specifications are being examined in LTE-Advanced Release 13, signals are transmitted using the same resources in X subframes in order to apply the above-described technique for improving channel estimation accuracy (e.g., refer to R1-151454, MCC Support, "Final Report of 3GPP TSG RAN WG1 #80 v1.0.0," February 2015).

In addition, as described above, it is assumed that, in LTE, srs-SubframeConfig illustrated in FIG. 4 are defined as an example of cell-specific higher layer signaling for setting an SRS resource candidate group. That is, a transmission period ($T_{SFC}$) in which an SRS is transmitted and an offset ($\Delta_{SFC}$) for specifying a subframe with which transmission of SRSs starts are transmitted from the base station 100 to the terminal 200. The terminal 200, therefore, can identify whether there is an SRS transmission candidate subframe in a period in which a repetition signal is transmitted in X consecutive subframes. The terminal 200, therefore, prevents a collision between an SRS and a data signal by not performing data transmission with a last SC-FDMA symbol (SRS resource candidate) of the SRS transmission candidate subframe.

Furthermore, in each embodiment of the present disclosure, the terminal 200 sets a transmission format for all the X subframes in accordance with whether there is an SRS transmission candidate subframe in a period in which a repetition signal is transmitted in X consecutive subframes in PUCCH repetition transmission. As a result, in PUCCH repetition, the channel estimation accuracy can be improved through cross-subframe channel estimation and symbol level combining at the base station while reducing an effect of collapse of orthogonality between OCC sequences.

A method for improving the channel estimation accuracy through the cross-subframe channel estimation and the symbol level combining in PUCCH repetition will be described hereinafter as an example.

Figure 7:
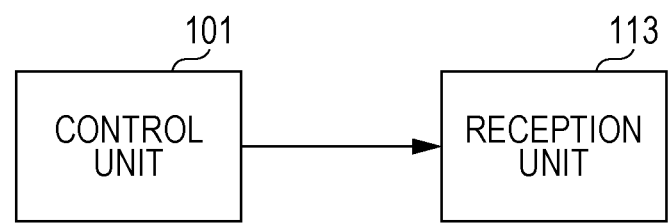
FIG. 7 is a block diagram illustrating essential components of a base station according to a first embodiment.

FIG. 7 is a block diagram illustrating essential components of the base station 100 according to each embodiment of the present disclosure. In the base station 100 illustrated in FIG. 7, if a plurality of subframes in which an uplink signal is repeated do not include an SRS transmission candidate subframe, a control unit 101 sets a first transmission format for all the plurality of subframes. If the plurality of subframes include an SRS transmission candidate subframe, the control unit 101 sets a second transmission format for all the plurality of subframes. A reception unit 113 receives the repetition signals using the set transmission format.

Figure 8:
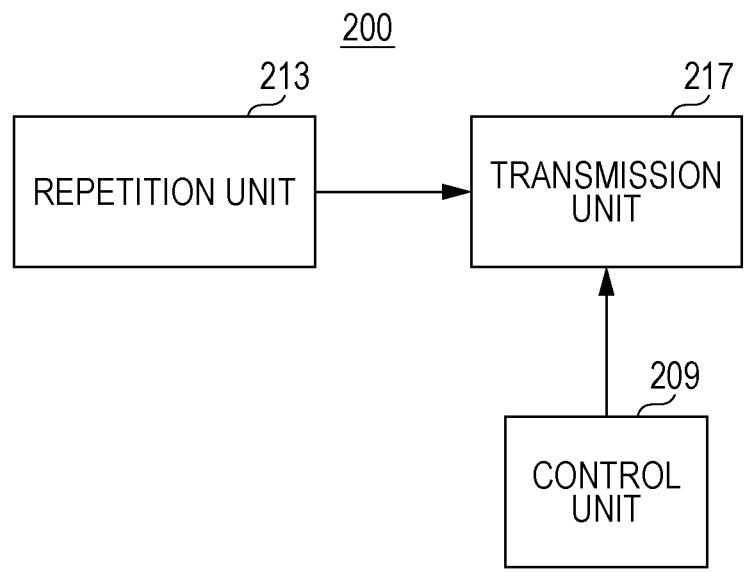
FIG. 8 is a block diagram illustrating essential components of a terminal according to the first embodiment.

In addition, FIG. 8 is a block diagram illustrating essential components of the terminal 200 according to each embodiment of the present disclosure. In the terminal 200 illustrated in FIG. 8, a repetition unit 213 repeats an uplink signal over a plurality of subframes to generate repetition signals. If a plurality of subframes do not include an SRS transmission candidate subframe, a control unit 209 sets the first transmission format for all the plurality of subframes. If the plurality of subframes include an SRS transmission candidate subframe, the control unit 209 sets the second transmission format for all the plurality of subframes. A transmission unit 217 transmits the repetition signals using the set transmission format.

First Embodiment

Configuration of Base Station

Figure 9:
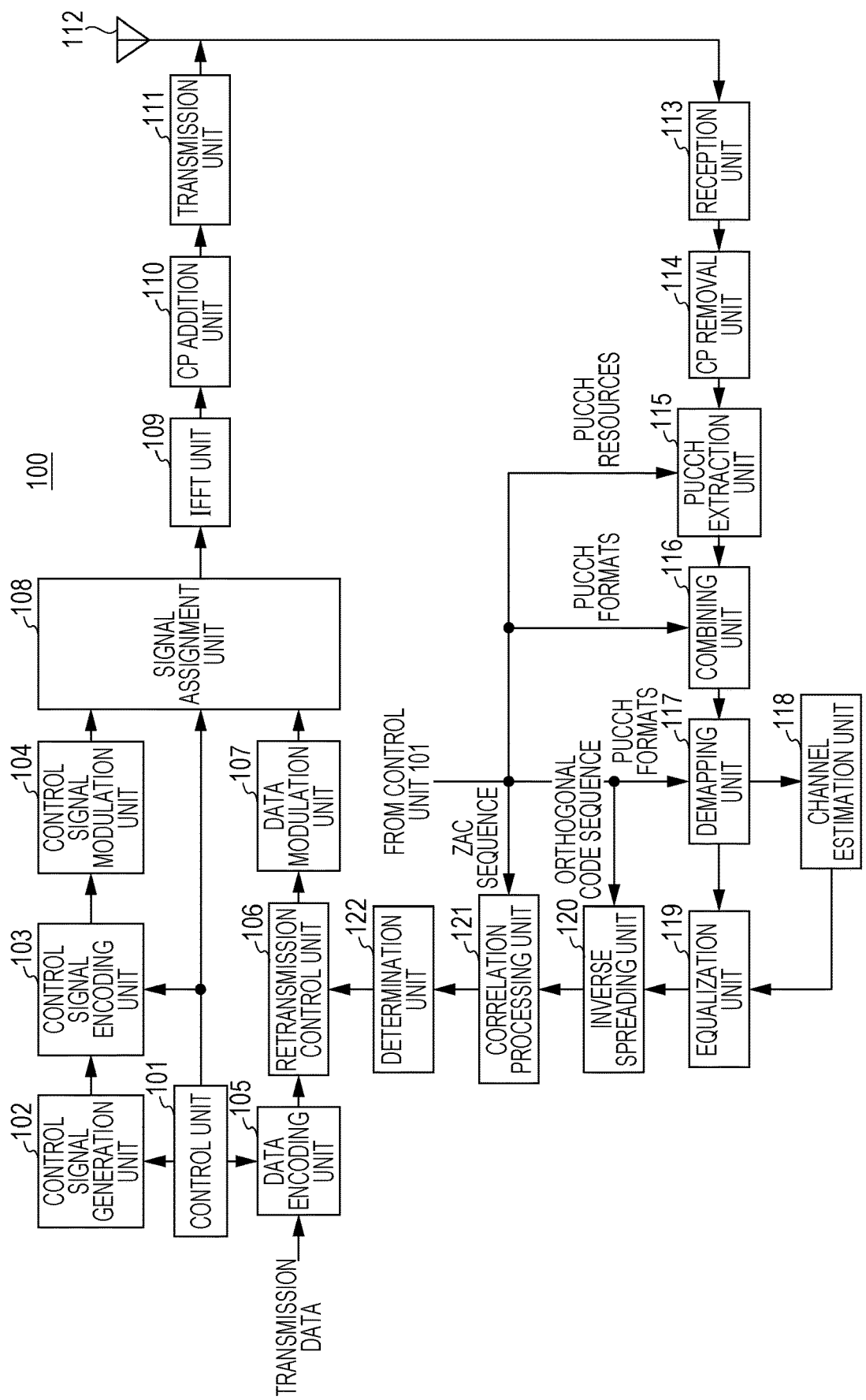
FIG. 9 is a block diagram illustrating the configuration of the base station according to the first embodiment.

FIG. 9 is a block diagram illustrating the configuration of the base station 100 according to a first embodiment of the present disclosure. In FIG. 9, the base station 100 includes the control unit 101, a control signal generation unit 102, a control signal encoding unit 103, a control signal modulation unit 104, a data encoding unit 105, a retransmission control unit 106, a data modulation unit 107, a signal assignment unit 108, an IFFT (Inverse Fast Fourier Transform) unit 109, a CP addition unit 110, a transmission unit 111, an antenna 112, the reception unit 113, a CP removal unit 114, a PUCCH extraction unit 115, a combining unit 116, a demapping unit 117, a channel estimation unit 118, an equalization unit 119, a de-spreading unit 120, a correlation processing unit 121, and a determination unit 122.

The control unit 101 determines an SRS resource candidate group in a cell covered by the base station 100 in consideration of the number of SRS resources necessary for each of a plurality of existing LTE terminals located in the cell and outputs information indicating the determined SRS resource candidate group to the control signal generation unit 102. The SRS resource candidate group is selected, for example, from a table illustrated in FIG. 4.

In addition, the control unit 101 determines a PUCCH format of each subframe in PUCCH repetition on the basis of the information regarding the determined SRS resource candidate group and outputs information indicating the determined PUCCH format to the combining unit 116.

In addition, the control unit 101 determines the assignment of a physical downlink shared channel (PDSCH) for an MTC coverage enhancement terminal. At this time, the control unit 101 determines frequency assignment resources and modulation and encoding methods to be specified to the MTC coverage enhancement terminal and outputs information regarding the determined parameters to the control signal generation unit 102.

In addition, the control unit 101 determines an encoding level for control signals and outputs the determined encoding level to the control signal encoding unit 103. In addition, the control unit 101 determines radio resources (downlink resources) in which control signals and downlink data are to be mapped and outputs information regarding the determined radio resources to the signal assignment unit 108. In addition, the control unit 101 determines a coding rate used to transmit downlink data (transmission data) for a resource assignment target terminal 200 and outputs the determined coding rate to the data encoding unit 105.

In addition, the control unit 101 determines a coverage enhancement level of the MTC coverage enhancement terminal and outputs information regarding the determined coverage enhancement level or the number of repetitions necessary for PUCCH transmission at the determined coverage enhancement level to the control signal generation unit 102 and the combining unit 116. In addition, the control unit 101 generates information regarding a parameter X used by the MTC coverage enhancement terminal for the PUCCH repetition on the basis of the information regarding the coverage enhancement level or the number of repetitions necessary for the PUCCH transmission and outputs the generated information to the control signal generation unit 102.

In addition, the control unit 101 determines resources (a cyclic shift, an orthogonal code sequence, and a frequency) with which the terminal 200 transmits a PUCCH. The control unit 101 outputs a cyclic shift index and an orthogonal code sequence that might be used for the PUCCH transmission to the de-spreading unit 120 and the correlation processing unit 121, respectively, and outputs information regarding a frequency resource used for the PUCCH transmission to the PUCCH extraction unit 115. The information regarding these PUCCH resources may be implicitly transmitted to the terminal 200, or may be transmitted to the terminal 200 (the control unit 209 that will be described later) through higher layer signaling specific to the terminal 200.

The control signal generation unit 102 generates a control signal for the MTC coverage enhancement terminal. The control signal includes a cell-specific higher layer signal, a UE-specific higher layer signal, or downlink assignment information specifying the assignment of the PDSCH.

The downlink assignment information is composed of a plurality of bits and includes information specifying a frequency assignment resource, modulation and encoding methods, and the like. In addition, the downlink assignment information may include information regarding the coverage enhancement level or the number of repetitions necessary for the PUCCH transmission and information regarding the value of the parameter X used for the PUCCH repetition.

The control signal generation unit 102 generates a control information bit string using control information input from the control unit 101 and outputs the generated control information bit sequence (control signal) to the control signal encoding unit 103. It is to be noted that because the control information might be transmitted to a plurality of terminals 200, the control signal generation unit 102 generates the bit sequence while including a terminal ID of each terminal 200 in control information for the terminal 200. For example, a CRC bit masked by a terminal identifier (ID) of a destination terminal is added to the control information.

In addition, the information regarding the SRS resource candidate group is transmitted to the MTC coverage enhancement terminal (the control unit 209 described later) using a cell-specific higher layer signal. The information regarding the coverage enhancement level and the number of repetitions necessary for the PUCCH transmission may be transmitted to the MTC coverage enhancement terminal through UE-specific higher layer signaling, or, as described above, may be transmitted using the downlink assignment information specifying the assignment of the PDSCH. In addition, the information regarding the value of the parameter X used for the PUCCH repetition may be similarly transmitted to the MTC coverage enhancement terminal through UE-specific higher layer signaling, or may be transmitted using the downlink assignment information specifying the assignment of the PDSCH. Furthermore, in the case of a predefined standard parameter, the information regarding the value of the parameter X used for the PUCCH repetition need not be transmitted to the terminal from the base station 100.

The control signal encoding unit 103 encodes the control signal (control information bit string) received from the control signal generation unit 102 in accordance with the encoding level specified from the control unit 101 and outputs the encoded control signal to the control signal modulation unit 104.

The control signal modulation unit 104 modulates the control signal received from the control signal encoding unit 103 and outputs the modulated control signal (symbol sequence) to the signal assignment unit 108.

The data encoding unit 105 performs error correction coding such as turbo coding on transmission data (downlink data) in accordance with the coding rate received from the control unit 101 and outputs the encoded data signal to the retransmission control unit 106.

In initial transmission, the retransmission control unit 106 holds the encoded data signal received from the data encoding unit 105 while outputting the encoded data signal to the data modulation unit 107. The retransmission control unit 106 holds the encoded data signal for each destination terminal. In addition, if the retransmission control unit 106 receives a NACK for the transmitted data signal from the determination unit 122, the retransmission control unit 106 outputs corresponding data held thereby to the data modulation unit 107. If the retransmission control unit 106 receives an ACK for the transmitted data signal from the determination unit 122, the retransmission control unit 106 deletes corresponding data held thereby.

The data modulation unit 107 modulates the data signal received from the retransmission control unit 106 and outputs the data modulated signal to the signal assignment unit 108.

The signal assignment unit 108 maps the control signal (symbol sequence) received from the control signal modulation unit 104 and the data modulated signal received from the data modulation unit 107 in the radio resources specified by the control unit 101. It is to be noted that a control channel in which the control signal is mapped may be a physical downlink control channel (PDCCH) for MTC or may be an EPDCCH (Enhanced PDCCH). The signal assignment unit 108 outputs, to the IFFT unit 109, a downlink subframe signal including the PDCCH for MTC or the EPDCCH in which the control signal has been mapped.

The IFFT unit 109 performs an IFFT process on the signal received from the signal assignment unit 108 to transform a frequency-domain signal into a time-domain signal. The IFFT unit 109 outputs the time-domain signal to the CP addition unit 110.

The CP addition unit 110 adds a CP to the signal received from the IFFT unit 109 and outputs, to the transmission unit 111, the signal (OFDM signal) to which the CP has been added.

The transmission unit 111 performs an radio frequency (RF) process such as digital-to-analog (D/A) conversion or upconversion on the OFDM signal received from the CP addition unit 110 and transmits a radio signal to the terminal 200 through the antenna 112.

The reception unit 113 performs an RF process such as downconversion or analog-to-digital (A/D) conversion on an uplink signal (PUCCH) from the terminal 200 received through the antenna 112 and outputs the obtained reception signal to the CP removal unit 114. The uplink signal (PUCCH) transmitted from the terminal 200 includes signals over a plurality of subframes subjected to a repetition process.

The CP removal unit 114 removes a CP added to the reception signal received from the reception unit 113 and outputs the signal from which the CP has been removed to the PUCCH extraction unit 115.

The PUCCH extraction unit 115 divides the signal received from the CP removal unit 114 into frequency-domain signal sequences by applying a fast Fourier transform (FFT) process to the signal on the basis of the information regarding PUCCH resources received from the control unit 101, extracts a signal corresponding to the PUCCH, and outputs the extracted PUCCH signal to the combining unit 116.

The combining unit 116 performs coherent combining on parts of the signal corresponding to a response signal and reference signals through the symbol level combining for the PUCCH over a plurality of subframes subjected to repetition transmission using information regarding PUCCH repetition and information regarding a PUCCH format of each subframe input from the control unit 101. The combining unit 116 outputs a resultant signal to the demapping unit 117.

The demapping unit 117 divides the signal (a subframe portion of the PUCCH) received from the combining unit 116 into the reference signals and the response signal using the information regarding the PUCCH format of each subframe input from the control unit 101 and outputs the reference signals to the channel estimation unit 118 and the response signal to the equalization unit 119.

The channel estimation unit 118 performs channel estimation using the reference signals input from the demapping unit 117. The channel estimation unit 118 outputs an obtained channel estimation value to the equalization unit 119.

The equalization unit 119 equalizes the response signal input from the demapping unit 117 using the channel estimation value input from the channel estimation unit 118.

The equalization unit 119 outputs the equalized response signal to the de-spreading unit 120.

The de-spreading unit 120 de-spreads a part of the signals received from the equalization unit 119 corresponding to the response signal using the orthogonal code sequence (an orthogonal code sequence to be used by the terminal 200) received from the control unit 101 and outputs the de-spread signals to the correlation processing unit 121.

The correlation processing unit 121 obtains a correlation value between a ZAC sequence input from the control unit 101 (a ZAC sequence that might be used by the terminal 200; a cyclic shift index) and the signal input from the de-spreading unit 120 and outputs the correlation value to the determination unit 122.

The determination unit 122 determines, on the basis of the correlation value received from the correlation processing unit 121, whether a response signal transmitted from the terminal 200 indicates an ACK or a NACK for transmitted data. The determination unit 122 outputs a result of the determination to the retransmission control unit 106.

Configuration of Terminal

Figure 10:
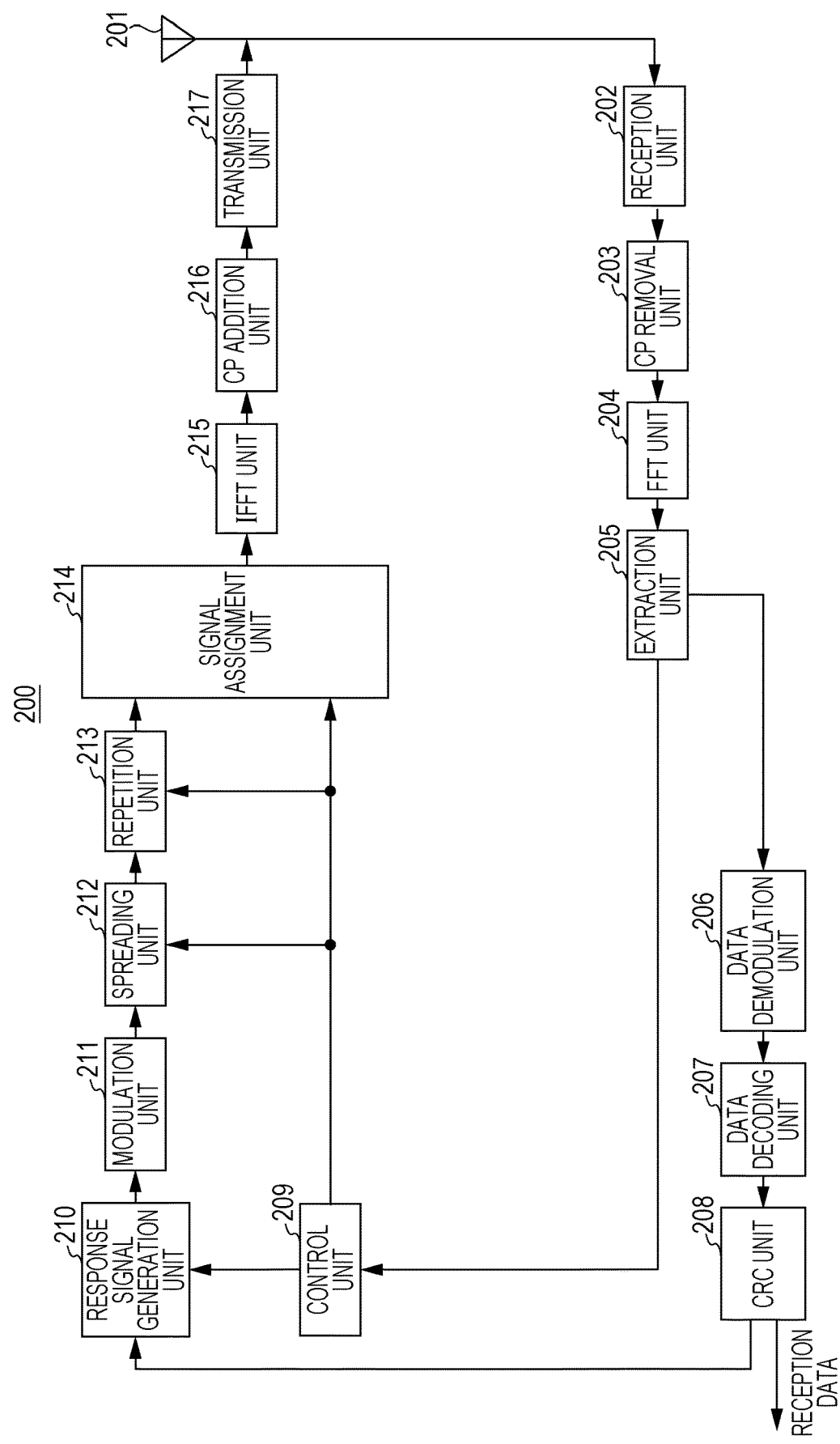
FIG. 10 is a block diagram illustrating the configuration of the terminal according to the first embodiment.

FIG. 10 is a block diagram illustrating the configuration of the terminal 200 according to the first embodiment of the present disclosure. In FIG. 10, the terminal 200 includes an antenna 201, a reception unit 202, a CP removal unit 203, an FFT unit 204, an extraction unit 205, a data demodulation unit 206, a data decoding unit 207, a CRC unit 208, the control unit 209, a response signal generation unit 210, a modulation unit 211, a spreading unit 212, the repetition unit 213, a signal assignment unit 214, an IFFT unit 215, a CP addition unit 216, and the transmission unit 217.

The reception unit 202 obtains a baseband OFDM signal by performing an RF process such as downconversion or A/D conversion on a radio signal (a PDCCH for MTC or an EPDCCH) received from the base station 100 through the antenna 201. The reception unit 202 outputs the OFDM signal to the CP removal unit 203.

The CP removal unit 203 removes a CP added to the OFDM signal received from the reception unit 202 and outputs the signal from which the CP has been removed to the FFT unit 204.

The FFT unit 204 performs an FFT process on the signal received from the CP removal unit 203 to transform a time-domain signal into a frequency-domain signal. The FFT unit 204 outputs the frequency-domain signal to the extraction unit 205.

The extraction unit 205 performs blind decoding on the frequency-domain signal (the PDCCH for MTC or the EPDCCH) received from the FFT unit 204 to attempt to decode the control signal transmitted to the terminal 200. A CRC masked by a terminal ID of the terminal is added to the control signal transmitted to the terminal 200. If a result of a CRC check is OK as a result of the blind decoding, therefore, the extraction unit 205 extracts control information and outputs the control information to the control unit 209. In addition, the extraction unit 205 extracts downlink data (PDSCH signal) from the signal received from the FFT unit 204 and outputs the downlink data to the data demodulation unit 206.

The data demodulation unit 206 demodulates the downlink data received from the extraction unit 205 and outputs the demodulated downlink data to the data decoding unit 207.

The data decoding unit 207 decodes the downlink data received from the data demodulation unit 206 and outputs the decoded downlink data to the CRC unit 208.

The CRC unit 208 performs error detection on the downlink data received from the data decoding unit 207 using a CRC and outputs a result of the error detection to the response signal generation unit 210. In addition, the CRC unit 208 outputs, as reception data, downlink data in which no error has been detected as a result of the error detection.

The control unit 209 controls PUCCH transmission on the basis of a control signal input from the extraction unit 205. More specifically, the control unit 209 instructs the signal assignment unit 214 to assign resources for the PUCCH transmission on the basis of PUCCH resource assignment information included in the control signal.

In addition, if the control signal includes information regarding a coverage enhancement level or information regarding the number of repetitions necessary for the PUCCH transmission, the control unit 209 determines the number of repetitions for PUCCH repetition transmission on the basis of the information. The control unit 209 specifies the information indicating the determined number of repetitions to the repetition unit 213. In addition, if the control signal includes information regarding a value of the parameter X used for PUCCH repetition, the control unit 209 specifies resource assignment for the PUCCH repetition transmission to the signal assignment unit 214.

In addition, if the control unit 209 receives, from the base station 100, information regarding a coverage enhancement level or information regarding the number of repetitions necessary for the PUCCH transmission, the control unit 209 determines the number of repetitions for the PUCCH repetition transmission on the basis of the received information. The control unit 209 specifies the determined information to the repetition unit 213. Similarly, if the control unit 209 receives, from the base station 100, information regarding a value of the parameter X used for the PUCCH repetition, the control unit 209 specifies resource assignment for the PUCCH repetition transmission to the signal assignment unit 214 on the basis of the received information.

In addition, as described above, the control unit 209 sets a transmission format (PUCCH format) of each subframe subjected to the PUCCH repetition on the basis of an SRS resource candidate group transmitted from the base station 100 through a cell-specific higher layer and outputs information regarding the set transmission format to the spreading unit 212 and the signal assignment unit 214.

In addition, the control unit 209 identifies PUCCH resources (a frequency, a cyclic shift index, and an orthogonal code sequence) using information regarding the PUCCH resources and outputs the identified information to the spreading unit 212 and the signal assignment unit 214.

The response signal generation unit 210 generates a response signal (ACK/NACK signal) for the received downlink data (PDSCH signal) on the basis of the result of the error detection received from the CRC unit 208. More specifically, the response signal generation unit 210 generates a NACK if an error is detected, and an ACK if an error is not detected. The response signal generation unit 210 outputs the generated response signal to the modulation unit 211.

The modulation unit 211 modulates a response signal received from the response signal generation unit 210 and outputs the modulated response signal to the spreading unit 212.

The spreading unit 212 performs primary spreading on reference signals and the response signal received from the modulation unit 211 using a ZAC sequence defined by the cyclic shift index set by the control unit 209. In addition, the spreading unit 212 performs secondary spreading on the response signal and the reference signals using the orthogonal code sequence set by the control unit 209 and outputs resultant signals to the repetition unit 213. It is to be noted that the spreading unit 212 performs the secondary spreading on the response signal on the basis of the information regarding the PUCCH format received from the control unit 209.

When the terminal 200 is in an MTC coverage enhancement mode, the repetition unit 213 repeats the signals input from the spreading unit 212 over a plurality of subframes on the basis of the number of repetitions specified by the control unit 209 to generate repetition signals. The repetition unit 213 outputs the repetition signals to the signal assignment unit 214.

The signal assignment unit 214 maps the signals received from the repetition unit 213 on the basis of the PUCCH time and frequency resources and the PUCCH format specified by the control unit 209. The signal assignment unit 214 outputs a PUCCH signal in which the signals have been mapped to the IFFT unit 215.

The IFFT unit 215 generates a time-domain signal by performing an IFFT process on the frequency-domain PUCCH signal input from the signal assignment unit 214. The IFFT unit 215 outputs the generated signal to the CP addition unit 216.

The CP addition unit 216 adds a CP to the time-domain signal received from the IFFT unit 215 and outputs the signal to which the CP has been added to the transmission unit 217.

The transmission unit 217 performs an RF process such as D/A conversion or upconversion on the signal received from the CP addition unit 216 and transmits a radio signal to the base station 100 through the antenna 201.

Operation of Base Station 100 and Terminal 200

The operation of the base station 100 and the terminal 200 having the above-described configurations will be described in detail.

The base station 100 transmits srs-SubframeConfig to the terminal 200 through cell-specific higher layer signaling for setting an SRS resource candidate group.

In addition, before a PUCCH is communicated, the base station 100 transmits the number of repetitions ($N_{Rep}$) to the terminal 200 in advance. The base station 100 may transmit the number of repetitions ($N_{Rep}$) to the terminal 200 through a UE-specific higher layer signaling, or using a PDCCH for MTC.

In addition, before the PUCCH is communicated, the base station 100 transmits the value of the parameter X to the terminal 200 in advance.

The terminal 200 repeatedly transmits the PUCCH by the number of repetitions ($N_{Rep}$) transmitted from the base station 100. If the number of repetitions ($N_{Rep}$) is larger than X, the terminal 200 transmits the repetition signals in X consecutive subframes using the same resources at least in the X consecutive subframes.

At this time, the terminal 200 determines whether an SRS transmission candidate subframe exists in each subframe in an X-subframe period on the basis of the srs-SubframeConfig transmitted from the base station 100.

If the X subframes do not include an SRS transmission candidate subframe, the terminal 200 sets a normal PUCCH format to all the X subframes. If the X subframes include an SRS transmission candidate subframe, on the other hand, the terminal 200 sets a shortened PUCCH format to all the X subframes. As a result, if an SRS transmission candidate subframe does not exist in the X-subframe period, the terminal 200 repeatedly transmits the PUCCH in X consecutive subframes using the normal PUCCH format. If an SRS transmission candidate subframe exists in the X-subframe period, on the other hand, the terminal 200 repeatedly transmits the PUCCH while applying the shortened PUCCH format to all the subframes.

On the other hand, if the X subframes subjected to the repetition in the terminal 200 do not include an SRS transmission candidate subframe, the base station 100 sets the normal PUCCH format to all the X subframes. If the X subframes subjected to the repetition in the terminal 200 include an SRS transmission candidate subframe, on the other hand, the base station 100 sets the shortened PUCCH format to all the X subframes. The base station 100 then receives the repetition signals using the set transmission format.

Figure 11:
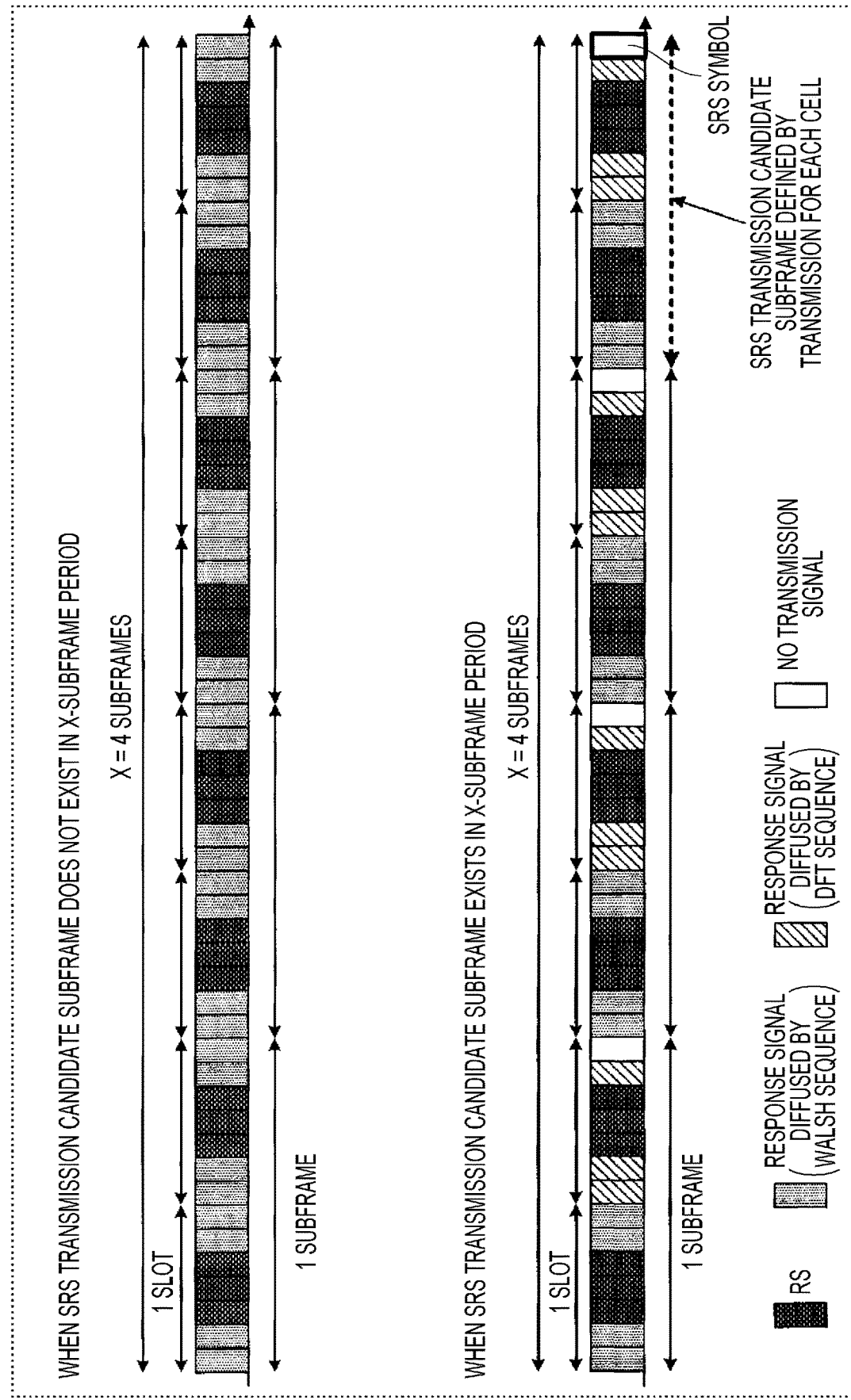
FIG. 11 is a diagram illustrating an example of the configuration of subframes according to the first embodiment.

FIG. 11 illustrates PUCCH repetition at a time when X=4 subframes.

Figure 1:
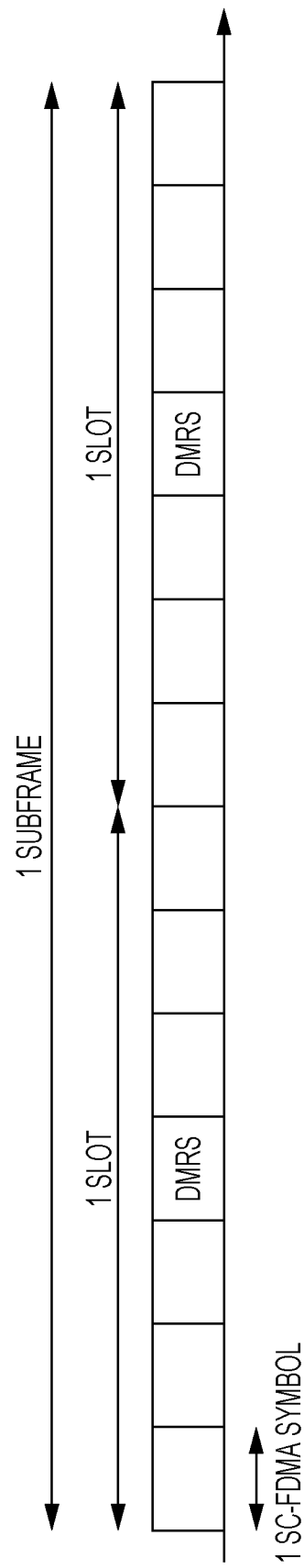
FIG. 1 is a diagram illustrating an example of the configuration of a subframe in a PUSCH.
Figure 2:
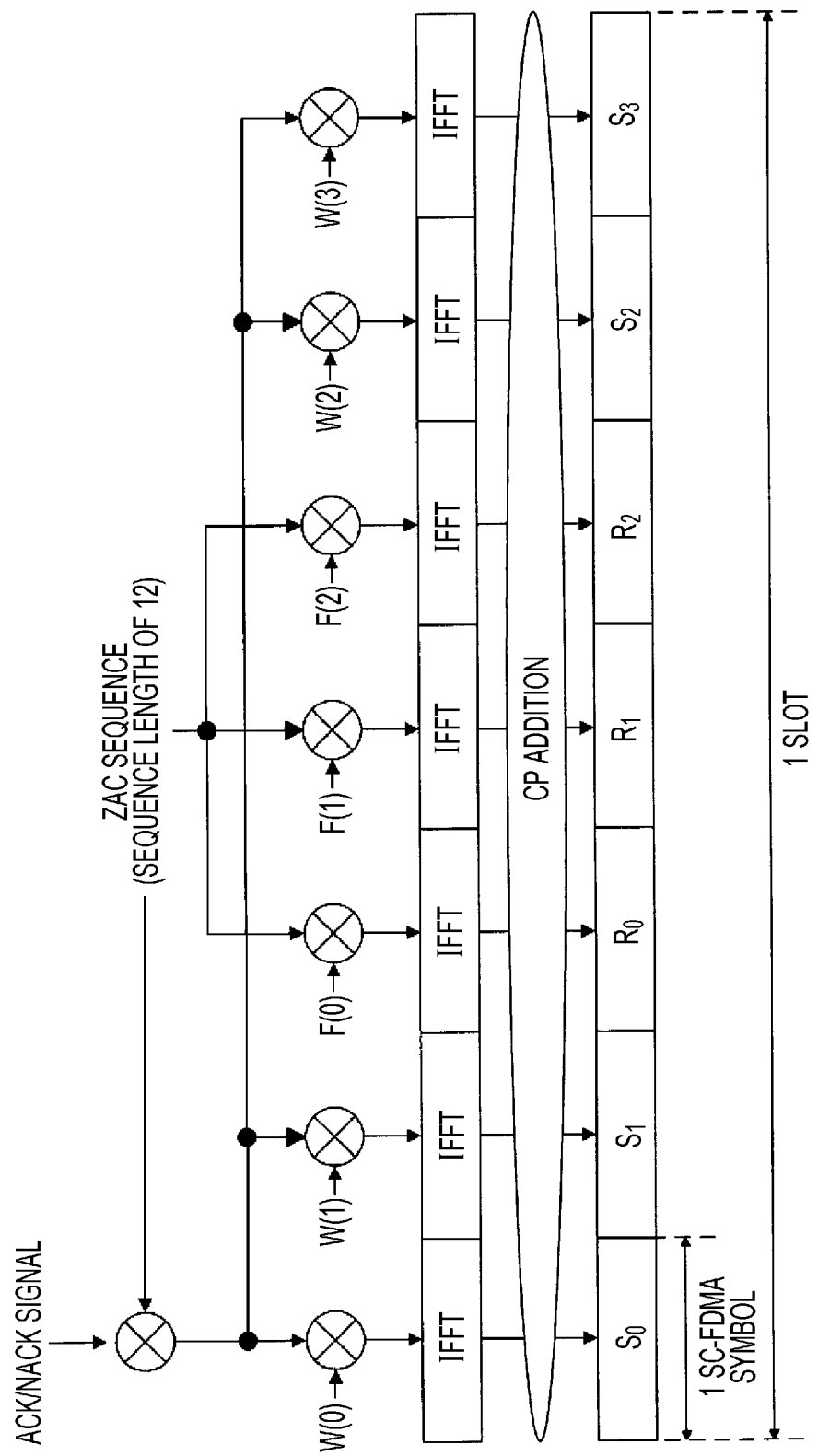
FIG. 2 is a diagram illustrating an example of a process for generating a response signal in a PUCCH.
Figure 3:
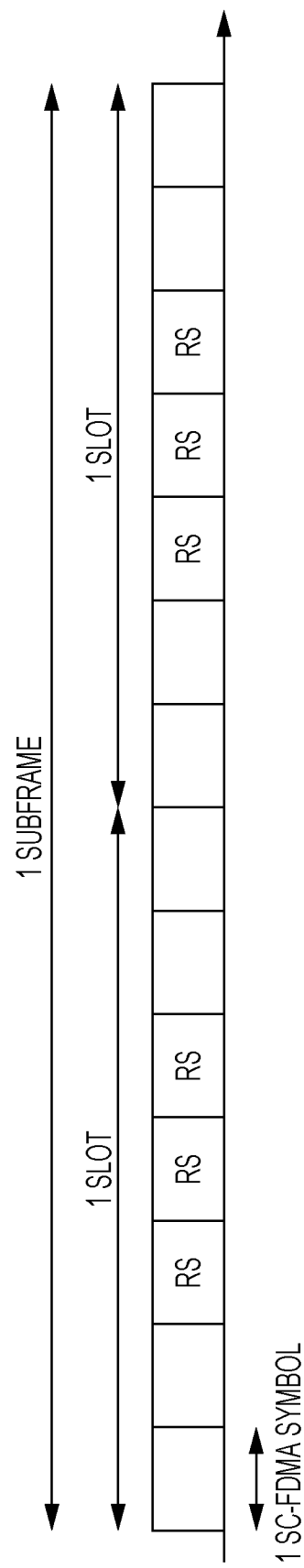
FIG. 3 is a diagram illustrating an example of the configuration of a subframe in the PUCCH.
Figure 5:
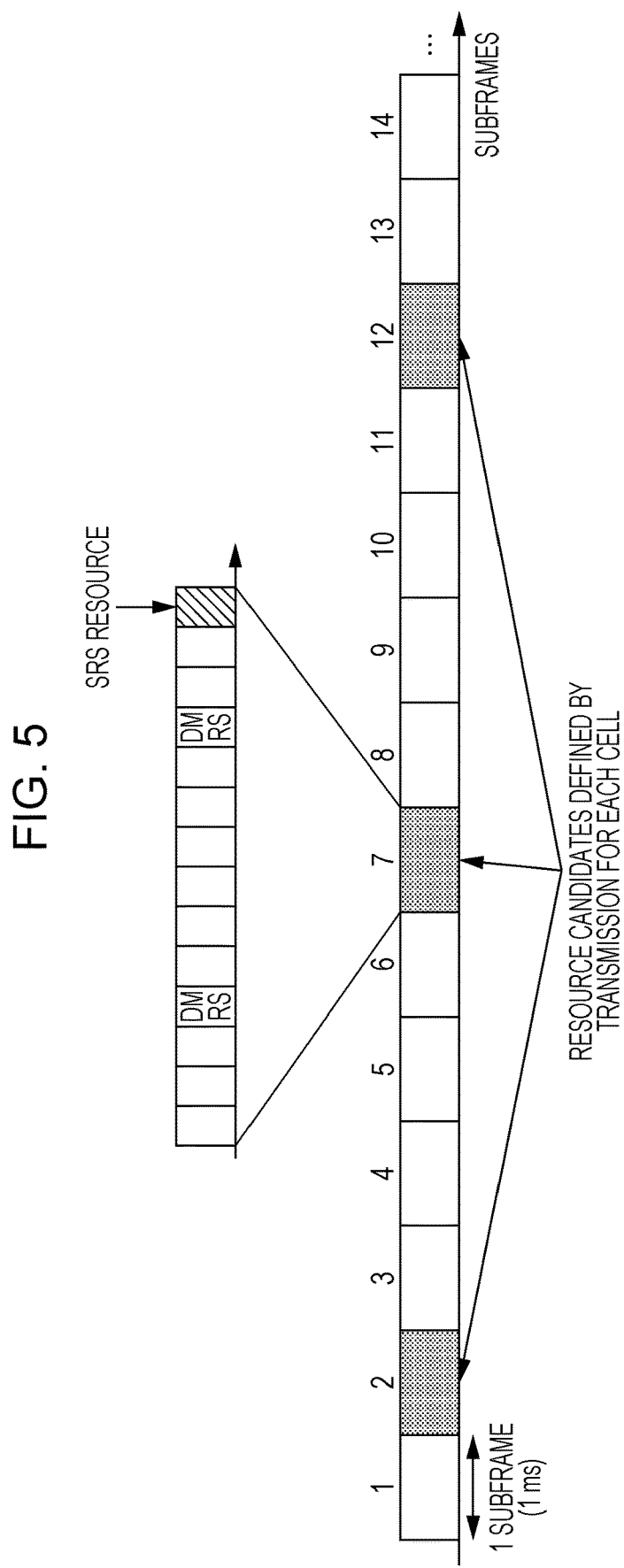
FIG. 5 is a diagram illustrating an example of setting of SRS transmission candidate subframes and an SRS resource.
Figure 6:
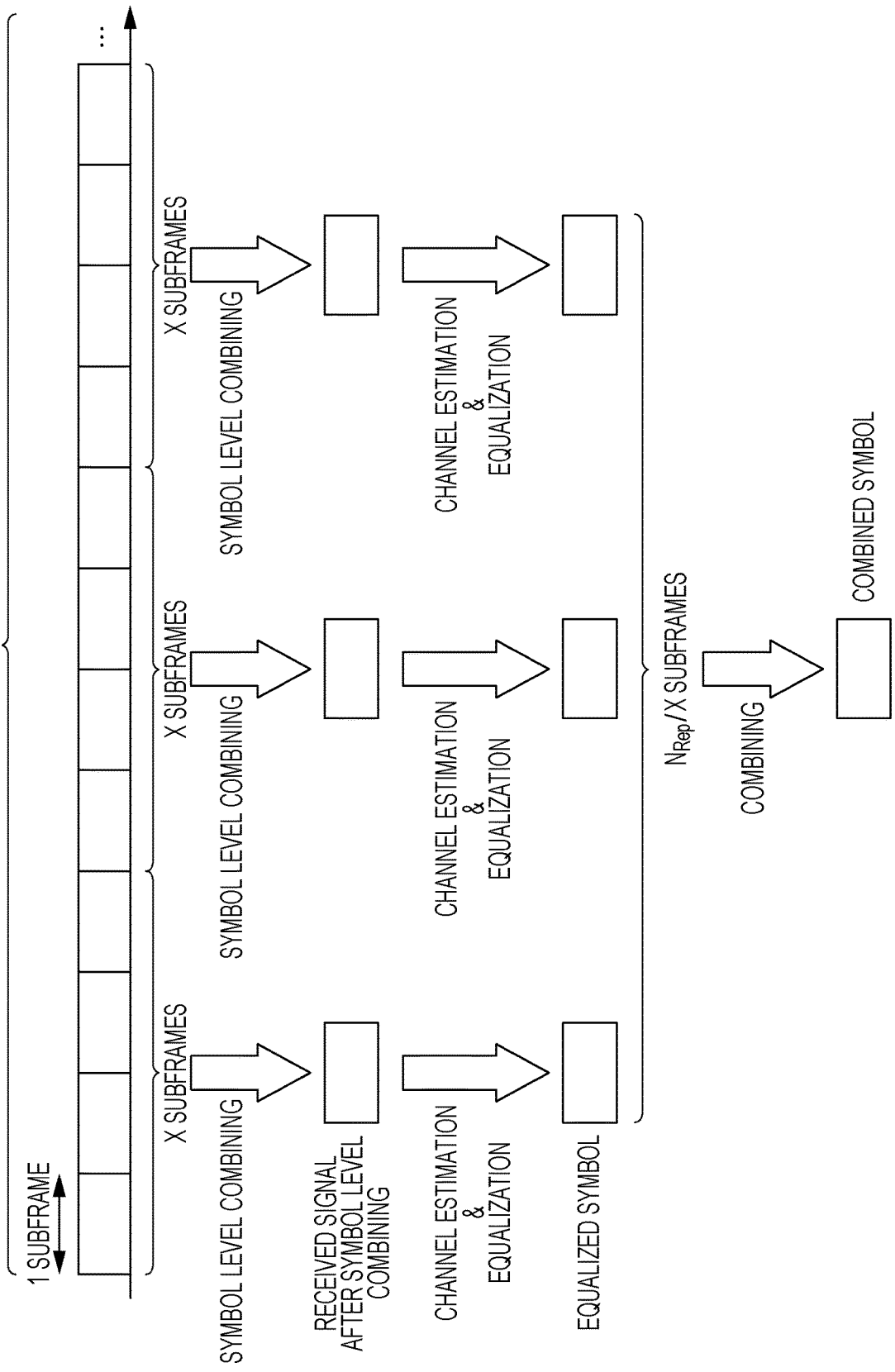
FIG. 6 is a diagram illustrating an example of the operation of cross-subframe channel estimation and symbol level combining.

If an SRS transmission candidate subframe does not exist in the X=4 subframe period, the normal PUCCH format (e.g., refer to FIG. 3) is applied to all the four subframes as illustrated in FIG. 11. As illustrated in FIG. 11, in the normal PUCCH format, a response signal mapped in each slot is spread by a Walsh sequence (a sequence length of 4).

If an SRS transmission candidate subframe exists in the X=4 subframe period (a fourth subframe in FIG. 11), on the other hand, the shortened PUCCH format is applied to all the four subframes as illustrated in FIG. 11. As illustrated in FIG. 11, in the shortened PUCCH format, a first slot is the same as in the normal PUCCH format, but in a second slot, a response signal to be mapped in symbols other than a last symbol is spread by a DFT sequence (a sequence length of 3).

That is, the PUCCH format to be applied to all the subframes in the X-subframe period is switched in accordance with whether an SRS transmission candidate subframe exists in the X-subframe period. In doing so, the same PUCCH format is set to all the subframes in the X-subframe period regardless of whether an SRS transmission candidate subframe exists in the X-subframe period.

As a result, even if the X-subframe period includes an SRS transmission candidate subframe, response signals are multiplied by the same OCC sequence (the Walsh sequence or a DFT sequence) in the SRS transmission candidate subframe and the other subframes. As a result, the base station 100 can perform coherent combining on the received PUCCH signal with the signal that has not been subjected to de-spreading.

The base station 100, therefore, can perform the cross-subframe channel estimation and the symbol level combining using X consecutive subframes without complicating the demodulation process.

In addition, as illustrated in FIG. 11, in each subframe to which the shortened PUCCH format is set, a signal is not mapped in a resource (SRS symbol) corresponding to a symbol (a last SC-FDMA symbol of the second slot) of the SRS transmission candidate subframe in which an SRS is mapped. If an SRS transmission candidate subframe exists in the X-subframe period, therefore, a collision between the response signal and the SRS can be avoided by using the shortened PUCCH format.

As described above, according to the present embodiment, even if an SRS transmission candidate subframe is included, the channel estimation accuracy can be improved through the cross-subframe channel estimation and the symbol level combining.

Second Embodiment

In an existing LTE system, a PUCCH is located at both edges of a system band along a frequency domain, and frequency hopping (inter-slot frequency hopping) is performed between the first and second slots.

In MTC, whose specifications are being examined in LTE-Advanced Release 13, on the other hand, an MTC terminal supports only a frequency bandwidth of 1.4 MHz (narrow band) in order to reduce the cost of the terminal (MTC terminal).

In MTC, therefore, it is considered that contribution to communication characteristics is larger in producing an effect of improving the estimation accuracy of channel estimation using reference signals in two slots of each subframe than in producing a frequency diversity effect through inter-slot frequency hopping within the 1.4 MHz band.

In the present embodiment, therefore, a case will be described in which, in PUCCH repetition, a PUCCH is transmitted using the same resources (that is, the same format) between the first and second slots of each subframe.

It is to be noted that a base station and a terminal according to the present embodiment have the same basic configurations as the base station 100 and the terminal 200 according to the first embodiment and will be described with reference to FIGS. 9 and 10.

The base station 100 transmits srs-SubframeConfig to the terminal 200 through cell-specific higher layer signaling for setting an SRS resource candidate group.

In addition, before a PUCCH is communicated, the base station 100 transmits the number of repetitions ($N_{Rep}$) to the terminal 200 in advance. The base station 100 may transmit the number of repetitions ($N_{Rep}$) to the terminal 200 through a UE-specific higher layer signaling, or using a PDCCH for MTC.

In addition, before the PUCCH is communicated, the base station 100 transmits the value of the parameter X to the terminal 200 in advance.

The terminal 200 repeatedly transmits the PUCCH by the number of repetitions ($N_{Rep}$) transmitted from the base station 100. If the number of repetitions ($N_{Rep}$) is larger than X, the terminal 200 transmits the repetition signals in X consecutive subframes using the same resources at least in the X consecutive subframes.

At this time, the terminal 200 determines whether an SRS transmission candidate subframe exists in each subframe in the X-subframe frame on the basis of the srs-SubframeConfig transmitted from the base station 100.

If the X subframes do not include an SRS transmission candidate subframe, the terminal 200 sets the normal PUCCH format to all the X subframes as in the first embodiment. That is, if an SRS transmission candidate subframe does not exist in the X-subframe period, the terminal 200 repeatedly transmits the PUCCH in X consecutive subframes using the normal PUCCH format.

If the X subframes include an SRS transmission candidate subframe, on the other hand, the terminal 200 sets the following specific transmission format to all the X subframes. More specifically, in the specific transmission format, the same format as that of the second slot of the shortened PUCCH format is set in the first and second slots of each subframe. That is, in the specific transmission format, a response signal is spread by the DFT sequence in the first and second slots of each subframe. That is, in each slot of all the subframes in the X-subframe period, the terminal 200 repeatedly transmits the PUCCH in X consecutive subframes using the same transmission format as that of the second slot of the shortened PUCCH format.

If the X subframes subjected to the repetition in the terminal 200 do not include an SRS transmission candidate subframe, on the other hand, the base station 100 sets the normal PUCCH format to all the X subframes. If the X subframes subjected to the repetition in the terminal 200 include an SRS transmission candidate subframe, on the other hand, the base station 100 sets the above-described specific transmission format to all the X subframes. The base station 100 then receives the repetition signals using the set transmission format.

Figure 12:
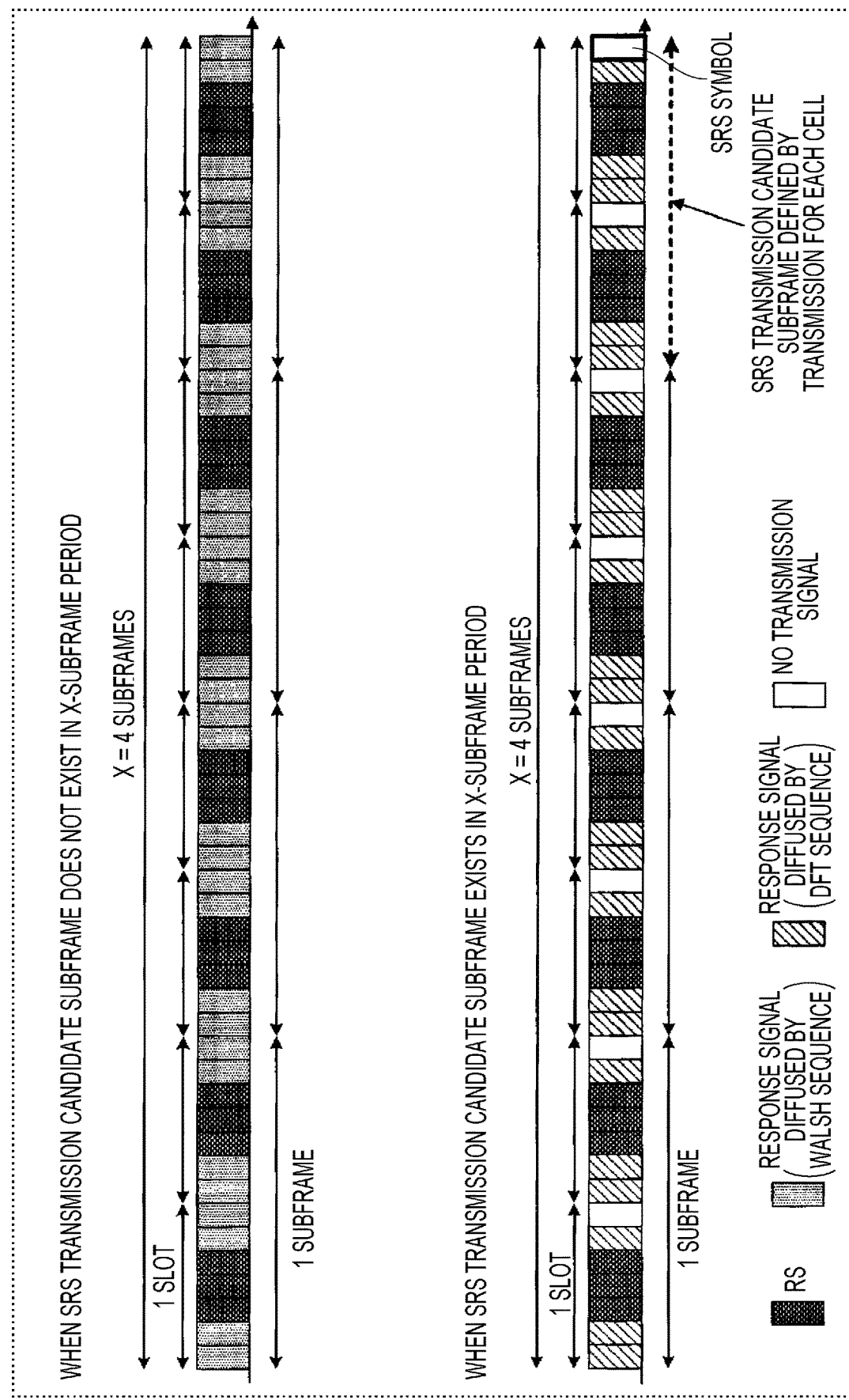
FIG. 12 is a diagram illustrating an example of the configuration of subframes according to a second embodiment.

FIG. 12 illustrates PUCCH repetition at a time when X=4 subframes.

If an SRS transmission candidate subframe does not exist in the X=4 subframe period, the normal PUCCH format (e.g., refer to FIG. 3) is applied to all the four subframes as illustrated in FIG. 12. As illustrated in FIG. 12, in the normal PUCCH format, a response signal mapped in each slot is spread by the Walsh sequence (a sequence length of 4).

If an SRS transmission candidate subframe exists in the X=4 subframe period (a fourth subframe in FIG. 12), on the other hand, the same transmission format as in the second slot of the shortened PUCCH format is applied to all the slots of the four subframes as illustrated in FIG. 12.

That is, as illustrated in FIG. 12, a response signal to be mapped in symbols other than a last symbol is spread by the DFT sequence (a sequence length of 3) in the first and second slots of each subframe. In addition, as illustrated in FIG. 12, in the second slot of each subframe to which this transmission format is set, a signal is not mapped in a resource (SRS symbol) corresponding to a symbol (last SC-FDMA symbol) in which an SRS is mapped. Furthermore, as illustrated in FIG. 12, a signal is not mapped in a resource (that is, a last SC-FDMA symbol of the first slot) of the first slot of each subframe to which this transmission format is set corresponding to a resource (that is, a last SC-FDMA symbol of the second slot) of the second slot of the transmission format in which a signal is not mapped.

As described above, the PUCCH format to be applied to all the subframes in the X-subframe period is switched in accordance with whether an SRS transmission candidate subframe exists in the X-subframe period. In doing so, the same PUCCH format is set to all the subframes in the X-subframe period regardless of whether an SRS transmission candidate subframe exists in the X-subframe period.

As a result, as in the first embodiment, even if the X-subframe period includes an SRS transmission candidate subframe, response signals are multiplied by the same OCC sequence (the Walsh sequence or the DFT sequence) in the SRS transmission candidate subframe and the other subframes. As a result, the base station 100 can perform coherent combining on the received PUCCH signal with the signal that has not been subjected to de-spreading. In addition, as in the first embodiment, even if X=4 subframes include an SRS transmission candidate subframe, a signal is not mapped in a resource (SRS symbol) corresponding to a symbol (the last SC-FDMA symbol of the second slot) of the SRS transmission candidate subframe in which an SRS is mapped. Even if an SRS transmission candidate subframe exists in the X-subframe period, therefore, a collision between the response signal and the SRS can be avoided.

In addition, in the present embodiment, if an SRS transmission candidate subframe exists in the X-subframe period, the same transmission format is set to all the slots in the X-subframe period. As a result, the base station 100 can combine not only signals in second slot but also signals in the first and second slots with each other. In the present embodiment, therefore, if an SRS transmission candidate subframe exists in the X-subframe period, cross-subframe channel estimation and symbol level combining employing 2× slots (eight slots in FIG. 12) can be performed. Thus, according to the present embodiment, the channel estimation accuracy can be further improved.

Third Embodiment

In the first and second embodiments, if there is even one SRS transmission candidate subframe in the X-subframe period, a response signal is not transmitted using last SC-FDMA symbols (e.g., refer to FIG. 11) or seventh SC-FDMA symbols and the last SC-FDMA symbols (that is, a last SC-FDMA symbol of each slot; e.g., refer to FIG. 12) of all the X subframes, and overhead becomes large.

In the present embodiment, therefore, a method for minimizing symbols with which a response signal is not transmitted and reducing the overhead will be described.

A base station and a terminal according to the present embodiment have the same basic configurations as the base station 100 and the terminal 200 according to the first embodiment and will be described with reference to FIGS. 9 and 10.

The base station 100 transmits srs-SubframeConfig to the terminal 200 through cell-specific higher layer signaling for setting an SRS resource candidate group.

In addition, before a PUCCH is communicated, the base station 100 transmits the number of repetitions ($N_{Rep}$) to the terminal 200 in advance. The base station 100 may transmit the number of repetitions ($N_{Rep}$) to the terminal 200 through a UE-specific higher layer signaling, or using a PDCCH for MTC.

In addition, before the PUCCH is communicated, the base station 100 transmits the value of the parameter X to the terminal 200 in advance.

The terminal 200 repeatedly transmits the PUCCH by the number of repetitions ($N_{Rep}$) transmitted from the base station 100. If the number of repetitions ($N_{Rep}$) is larger than X, the terminal 200 transmits the repetition signals in X consecutive subframes using the same resources at least in the X consecutive subframes.

At this time, the terminal 200 determines whether an SRS transmission candidate subframe exists in each subframe in the X-subframe period on the basis of the srs-SubframeConfig transmitted from the base station 100.

If the X subframes do not include an SRS transmission candidate subframe, the terminal 200 sets the normal PUCCH format to all the X subframes. In addition, if the X subframes include an SRS transmission candidate subframe, the terminal 200 sets the normal PUCCH format to all the X subframes.

Here, the repetition signals transmitted from the terminal 200 are spread using one of a plurality of orthogonal code sequences that are partially orthogonal to one another. The terminal 200, therefore, punctures a symbol (last SC-FDMA symbol) in which an SRS is mapped and a symbol (an SC-FDMA symbol immediately before the last SC-FDMA symbol) corresponding to a code that forms a pair with one of the plurality of codes included in the orthogonal code sequence corresponding to the last SC-FDMA symbol in the partially orthogonal relationship in the SRS transmission candidate subframe included in the X subframes.

On the other hand, the base station 100 sets the normal PUCCH format to all the X subframes regardless of whether the X subframes subjected to the repetition in the terminal 200 include an SRS transmission candidate subframe. If the X subframes subjected to the repetition in the terminal 200 include an SRS transmission candidate subframe, however, the base station 100 performs coherent combining on symbols of the SRS transmission candidate subframe other than the symbol in which the SRS is mapped and the symbol corresponding to the code that forms a pair with the code corresponding to the foregoing symbol in the partially orthogonal relationship.

Figure 13:
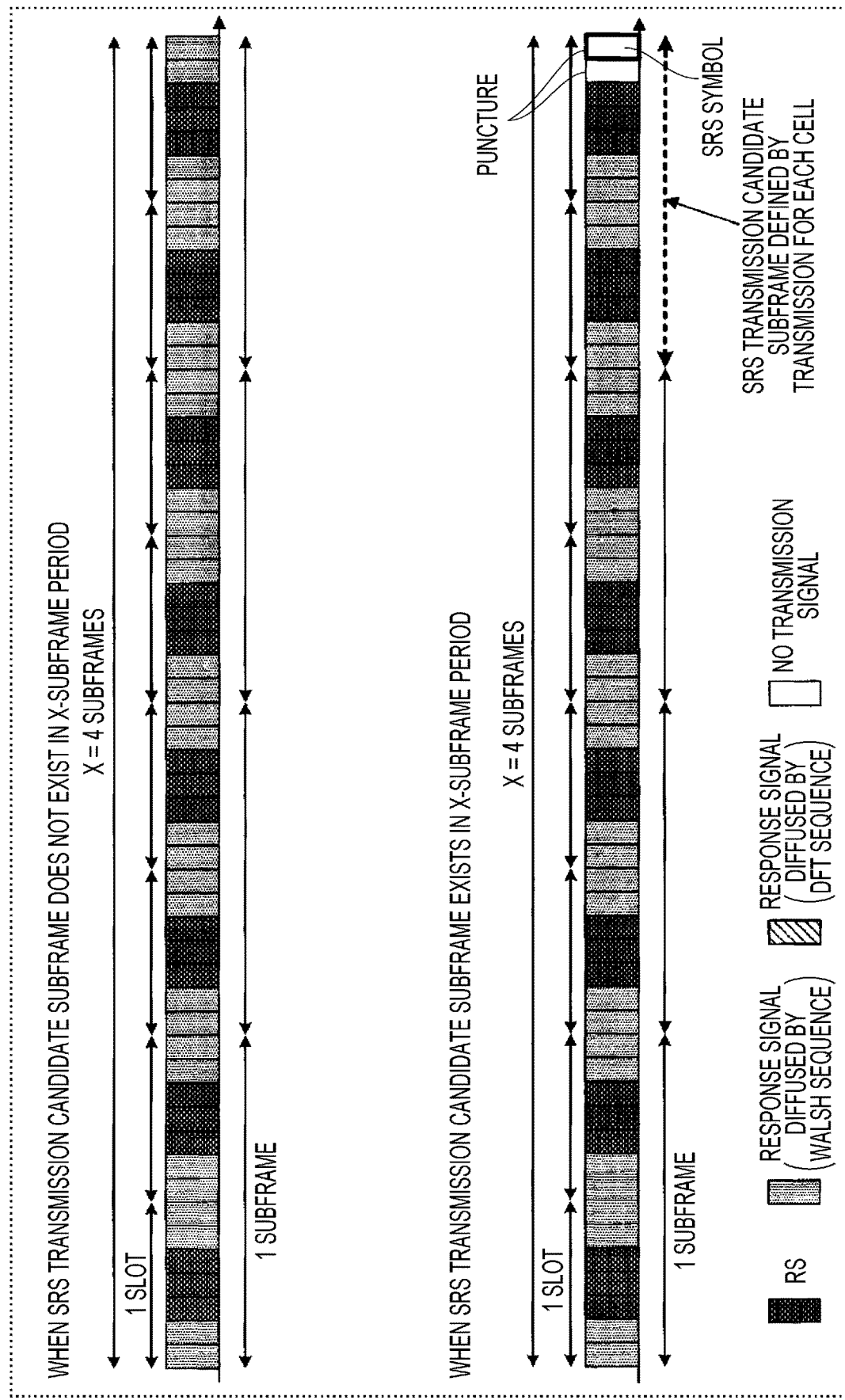
FIG. 13 is a diagram illustrating an example of the configuration of subframes according to a third embodiment.

FIG. 13 illustrates PUCCH repetition at a time when X=4 subframes.

If an SRS transmission candidate subframe does not exist in the X=4 subframe period, the normal PUCCH format (e.g., refer to FIG. 3) is set to all the four subframes as illustrated in FIG. 13. As illustrated in FIG. 13, in the normal PUCCH format, a response signal mapped in each slot is spread by the Walsh sequence (a sequence length of 4).

If an SRS transmission candidate subframe exists in the X=4 subframe period (a fourth subframe in FIG. 13), the normal PUCCH format is set to all the four subframes as illustrated in FIG. 13.

In addition, at this time, the terminal 200 limits candidates for an orthogonal code sequence (Walsh sequence) in which a response signal is to be spread to a sequence in which a partial sequence including, among the sequence length of 4, first two codes and a partial sequence including last two codes are partially orthogonal to each other. That is, the response signal is spread using one of the plurality of orthogonal code sequences that are partially orthogonal to one another. In addition, the terminal 200 punctures the last SC-FDMA symbol and the SC-FDMA symbol immediately before the last SC-FDMA symbol (that is, symbols corresponding to the second partial sequence (a pair of two codes) of the orthogonal code sequence) in the SRS transmission candidate subframe in the X=4 subframe period.

For example, as candidates for the orthogonal code sequence used to spread a response signal when an SRS transmission candidate subframe in the X=4 subframe period, two candidates of (W(0), W(1), W(2), W(3))=(1, 1, 1, 1) and (1, −1, 1, −1) or two candidates of (W(0), W(1), W(2), W(3))=(1, 1, 1, 1,) and (1, −1, −1, 1) can be used.

Here, a partial sequence (1, 1), which includes first two codes of the orthogonal code sequence (1, 1, 1, 1), is orthogonal to a partial sequence (1, −1), which includes first two codes of the orthogonal code sequence (1, −1, 1, −1), and a partial sequence (1, −1), which includes first two codes of the orthogonal code sequence (1, −1, −1, 1). In addition, a partial sequence (1, 1), which includes last two codes of the orthogonal code sequence (1, 1, 1, 1,), is orthogonal to a partial sequence (1, −1), which includes last two codes of the orthogonal code sequence (1, −1, 1, −1), and a partial sequence (−1, 1), which includes last two codes of the orthogonal code sequence (1, −1, −1, 1).

That is, the orthogonal code sequence (1, 1, 1, 1) is partially orthogonal to the orthogonal code sequences (1, −1, 1, −1) and (1, −1, −1, 1). In the orthogonal code sequences that are partially orthogonal to each other, sequences of first two (sequences each including first two codes) of the four symbols corresponding to the sequence length are orthogonal to each other, and sequences of last two (sequences each including last two codes) are orthogonal to each other.

If an SRS transmission candidate subframe exists in the X=4 subframe period, the terminal 200 limits the orthogonal code sequence to be used to spread a response signal to the above-described two candidates, namely (W(0), W(1), W(2), W(3))=(1, 1, 1, 1) and (1, −1, 1, −1) or (W(0), W(1), W(2), W(3))=(1, 1, 1, 1) and (1, −1, −1, 1), which are partially orthogonal to each other. In this case, the partial sequence including the last two codes of the orthogonal code sequence is assigned to the last SC-FDMA symbol of the SRS transmission candidate subframe and the SC-FDMA symbol immediately before the last SC-FDMA symbol. Even if the terminal 200 punctures the last SC-FDMA symbol and the SC-FDMA symbol immediately before the last SC-FDMA symbol in the SRS transmission candidate subframe, therefore, orthogonality between the SC-FDMA symbols to which the partial sequence including the first two codes of the orthogonal code sequence is maintained.

That is, since the orthogonal code sequences corresponding to the first two symbols are partially orthogonal to each other in the PUCCH signal received by the base station 100 with the SRS transmission candidate subframe, the orthogonality between the orthogonal code sequences does not collapse. The base station 100 can separate a plurality of response signals code-multiplexed by orthogonal code sequences partially orthogonal to each other in each subframe into the first two symbols and the last two symbols. The base station 100, therefore, can perform coherent combining using the first two symbols in the SRS transmission candidate subframe included in the X subframes.

As described above, in the present embodiment, the normal PUCCH format is used for all the subframes if an SRS transmission candidate subframe exists in the X-subframe period. In this case, in the SRS transmission candidate subframe, the terminal 200 punctures and transmits the last SC-FDMA symbol and the SC-FDMA symbol immediately before the last SC-FDMA symbol and limits the orthogonal code sequence used to spread a response signal to two orthogonal code sequences partially orthogonal to each other.

In doing so, in the X-subframe period, a symbol with which a response signal is not transmitted is not set to the subframes other than the SRS transmission candidate subframe, and a symbol with which a response signal is not transmitted is set only to the SRS transmission candidate subframe. The overhead in the X subframes, therefore, can be reduced. In addition, according to the present embodiment, the cross-subframe channel estimation and the symbol level combining can be achieved without collapsing the orthogonality between response signals transmitted using the SRS transmission candidate subframe in the X-subframe period.

Fourth Embodiment

In the first to third embodiments, it is assumed that the base station can combine reception signals over a plurality of subframes (X subframes) coherently, and it is supposed that phase discontinuity in transmission signals does not occur at least in the X-subframe period in the repetition transmission. It is also suggested that, in repetition transmission, phase discontinuity in transmission signals does not occur unless transmission power and a center frequency of an RF do not change (e.g., refer to R1-152528, RAN4, "LS Out on Additional Aspects for MTC," May 2015).

In the first and second embodiments, however, if at least one SRS transmission candidate subframe exists in the X-subframe period, the same transmission format as the shortened PUCCH format is used, and a symbol with which data is not transmitted appears in each subframe or in each slot (e.g., refer to FIGS. 11 and 12). In this case, transmission power changes in each subframe or in each slot. The above-described condition under which phase discontinuity in transmission signals does not occur is no longer satisfied, and phase discontinuity might occur in repetition transmission signals. If phase discontinuity in transmission signals occurs like this, it is difficult for the base station to perform coherent combining of reception signals over the X subframes, and an effect of improving the channel estimation accuracy might not be sufficiently produced.

In the present embodiment, therefore, a method for minimizing an effect of causing symbols with which data is not transmitted in a plurality of subframes subjected to PUCCH repetition will be described.

A base station and a terminal according to the present embodiment have the same basic configurations as the base station 100 and the terminal 200 according to the first embodiment and will be described with reference to FIGS. 9 and 10.

More specifically, if even one SRS transmission candidate subframe exists in the X-subframe period, the terminal 200 inserts dummy symbols into symbols with which data is not transmitted other than an SRS resource (the last SC-FDMA symbol of the SRS transmission candidate subframe). That is, if even one SRS transmission candidate subframe exists in the X-subframe period, the terminal 200 inserts dummy symbols into resources of subframes other than the SRS transmission candidate subframe in which signals are not mapped among the X subframes.

Figure 14:
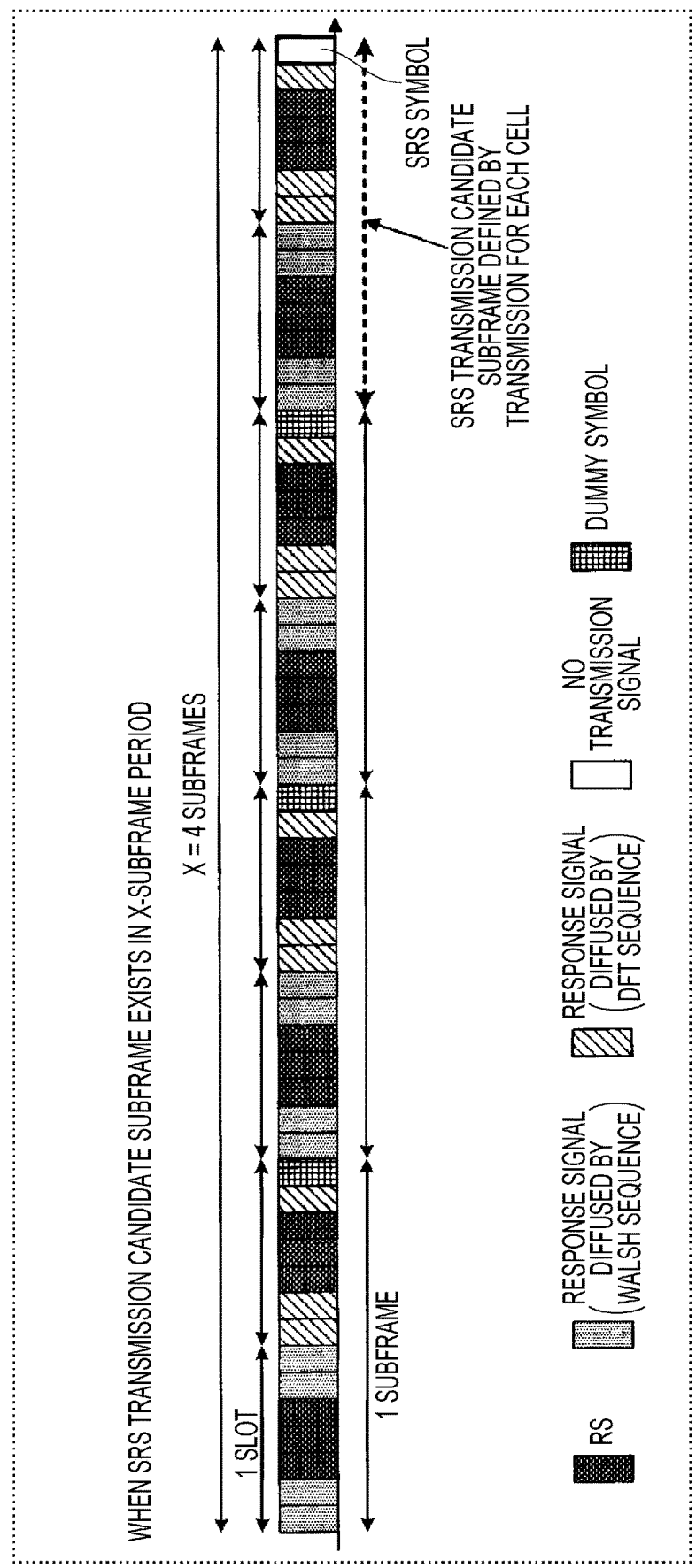
FIG. 14 is a diagram illustrating an example of the configuration of subframes according to a fourth embodiment.

FIG. 14 illustrates an example of insertion of dummy symbols at a time when the shortened PUCCH format is set to all the subframes and the PUCCH is repeatedly transmitted as in the first embodiment (FIG. 11). As illustrated in FIG. 14, the terminal 200 inserts dummy symbols into symbols (a last SC-FDMA symbol of each subframe) without a transmission symbol in the subframes other than the SRS transmission candidate subframe in FIG. 11.

Figure 15:
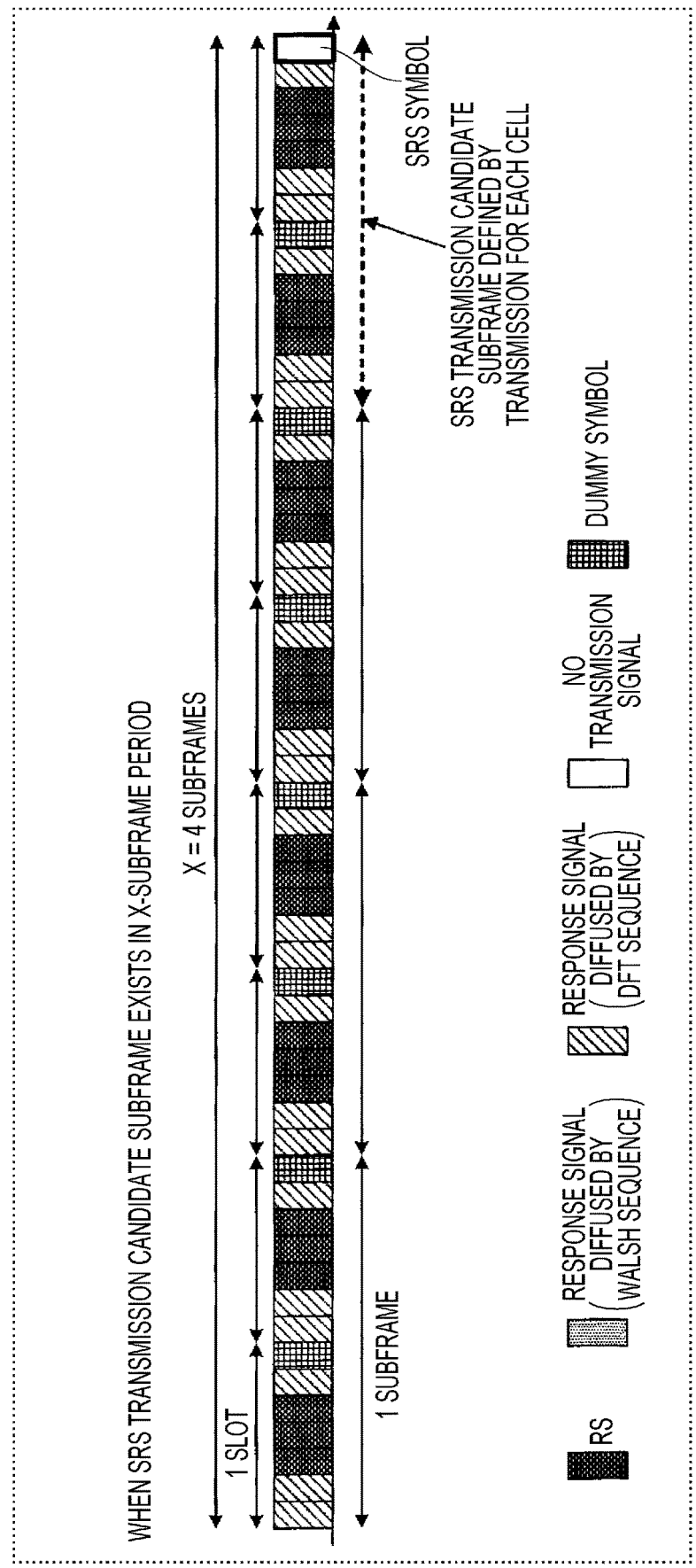
FIG. 15 is a diagram illustrating an example of the configuration of the subframes according to the fourth embodiment.

In addition, FIG. 15 illustrates an example of insertion of dummy symbols at a time when the same transmission format as that of the second slot of the shortened PUCCH format is applied to both the first and second slots of all the subframes and the PUCCH is repeatedly transmitted as in the second embodiment (FIG. 12). As illustrated in FIG. 15, the terminal 200 inserts dummy symbols into symbols (without transmission signals) with which data is not transmitted other than the SRS resource candidate (SRS symbol) in FIG. 12.

As a result, as illustrated in FIGS. 14 and 15, in the X=4 subframe period, the symbols other than the SRS symbol are either symbols in which data (an RS or a response signal) is mapped or dummy symbols, and there is no symbol in which a signal is not mapped. In the X=4 subframe period, therefore, transmission power does not change in the symbols other than the SRS symbol, and the above-described condition under which phase discontinuity in transmission signals does not occur is satisfied. In FIGS. 14 and 15, for example, the SRS symbol corresponds to the last SC-FDMA symbol of the X=4 subframes, and the condition under which phase discontinuity does not occur in the symbols other than the SRS symbol is satisfied.

Thus, in the present embodiment, dummy symbols are inserted into symbols with which data is not transmitted, the symbols being caused by a transmission format for avoiding a collision with an SRS in the PUCCH repetition. As a result, in the present embodiment, an effect of disabling the base station 100 from performing coherent combining of reception signals due to occurrence of phase discontinuity of repetition transmission signals can be minimized. As a result, the base station 100 can produce an effect of improving the channel estimation accuracy through coherent combining of reception signals over the X subframes.

The embodiments of the present disclosure have been described.

It is to be noted that although a method for switching the transmission format in accordance with whether an SRS transmission candidate subframe exists in the X-subframe period in the PUCCH repetition has been described in the first and second embodiments, the method may be also applied to PUSCH repetition. If an SRS transmission candidate subframe does not exist in the X-subframe period in the PUSCH repetition, for example, the terminal 200 repeatedly transmits a PUCCH in X consecutive subframes using a normal PUSCH format (data is mapped in 12 SC-FDMA symbols). If even one SRS transmission candidate subframe exists in the X-subframe period, on the other hand, the terminal 200 repeatedly transmits a PUSCH while mapping data in 11 SC-FDMA symbols (symbols other than a last symbol) in all the X subframes. In doing so, the same operation is employed between the PUCCH and the PUSCH, and the system can be simplified.

Similarly, in the fourth embodiment, the method for switching the transmission format in accordance with whether an SRS transmission candidate subframe exists in the X-subframe period in the PUCCH repetition and inserting dummy symbols into symbols with which data is not transmitted other than the SRS symbol of the SRS transmission candidate subframe may also be used for PUSCH repetition. If an SRS transmission candidate subframe does not exist in the X-subframe period in the PUSCH repetition, for example, the terminal 200 repeatedly transmits the PUSCH in X consecutive subframes using the normal PUSCH format (data is mapped in 12 SC-FDMA symbols). If even one SRS transmission candidate subframe exists in the X-subframe period, on the other hand, the terminal 200 repeatedly transmits a PUSCH while mapping data in 11 SC-FDMA symbols (symbols other than a last symbol) in all the X subframes. In addition, dummy symbols are inserted into symbols of the subframes other than the SRS transmission candidate subframe in which data is not mapped among the X subframes. In doing so, the same operation is employed between the PUCCH and the PUSCH, and the system can be simplified.

In addition, although a case in which the last subframe of the X-subframe period is an SRS transmission candidate subframe has been described in FIGS. 11 to 15, the last subframe of the X-subframe period is not limited to this. The above operation can be applied even when any subframe in the X-subframe period is an SRS transmission candidate subframe.

In addition, the number of repetitions, the value of the parameter X, and a value of a parameter defined by srs-SubframeConfig are examples, and are not limited to these.

In addition, although a case in which an aspect of the present disclosure is implemented by hardware has been described as an example in the above embodiments, the present disclosure can be implemented by software in combination with hardware.

In addition, each function block used in the above description of the embodiments is achieved as large-scale integration (LSI), which is typically an integrated circuit. The integrated circuit may control each function block used in the above description of the embodiments and include an input and an output. These may be individually achieved as a chip, or some or all of these may be achieved as a chip. Although LSI is used here, integrated circuit (IC), system LSI, super-LSI, or ultra-LSI may be used, instead, depending on a degree of integration.

In addition, a method for fabricating an integrated circuit is not limited to LSI, and an integrated circuit may be achieved by a dedicated circuit or a general-purpose processor. A field-programmable gate array (FPGA), which can be programmed after an LSI circuit is fabricated, or a reconfigurable processor, which is capable of reconfiguring connections and settings of circuit cells inside an LSI circuit, may be used, instead.

Furthermore, if a technique for fabricating an integrated circuit that replaces LSI appears as a result of evolution of semiconductor technologies or other derivative technologies, the function blocks may obviously be integrated using the technique. One of such possibilities is application of biotechnology.

A terminal in the present disclosure is configured to include a repeater that generates repetition signals by repeating an uplink signal over a plurality of subframes, a controller that, if the plurality of subframes do not include a transmission candidate subframe of a sounding reference signal used to measure uplink reception quality, sets a first transmission format to all the plurality of subframes and, if the plurality of subframes include the transmission candidate subframe, sets a second transmission format to all the plurality of subframes, and a transmitter that transmits the repetition signals using the set transmission format.

In the terminal in the present disclosure, in each subframe to which the second transmission format is set, a signal is not mapped in a resource corresponding to a symbol of the transmission candidate subframe in which the SRS is mapped.

In the terminal in the present disclosure, each subframe includes a first slot and a second slot. The sounding reference signal is mapped in the second slot of the transmission candidate subframe. In the second slot of each subframe to which the second transmission format is set, a signal is not mapped in a resource corresponding to a symbol in which the sounding reference signal is mapped.

In the terminal in the present disclosure, in the first slot of each subframe to which the second transmission format is set, a signal is not mapped in a resource corresponding to a resource of the second slot of the second transmission format in which the signal is not mapped.

In the terminal in the present disclosure, the repetition signals are spread using one of a plurality of orthogonal code sequences that are partially orthogonal to one another. The controller punctures, in the transmission candidate subframe included in the plurality of subframes, a first symbol, in which the sounding reference signal is mapped, and a second symbol, which corresponds to, among a plurality of codes included in the orthogonal code sequence, a second code, which forms a pair with a first code corresponding to the first symbol.

In the terminal in the present disclosure, the controller inserts, in the subframes other than the transmission candidate subframe among the plurality of subframes to which the second transmission format is set, a dummy symbol to a resource with which the signal is not transmitted.

In the terminal in the present disclosure, the first transmission format is a normal physical uplink control channel format, and the second transmission format is a shortened physical uplink control channel format.

A base station in the present disclosure includes a controller that, if a plurality of subframes in which an uplink signal is repeated do not include a transmission candidate subframe of a sounding reference signal used to measure uplink reception quality, sets a first transmission format to all the plurality of subframes and, if the plurality of subframes include the transmission candidate subframe, sets a second transmission format to all the plurality of subframes, and a receiver that receives the repetition signals using the set transmission format.

A transmission method in the present disclosure includes generating repetition signals by repeating an uplink signal over a plurality of subframes, setting, if the plurality of subframes do not include a transmission candidate subframe of a sounding reference signal used to measure uplink reception quality, a first transmission format to all the plurality of subframes and setting, if the plurality of subframes include the transmission candidate subframe, a second transmission format to all the plurality of subframes, and transmitting the repetition signals using the set transmission format.

A reception method in the present disclosure includes setting, if a plurality of subframes in which an uplink signal is repeated do not include a transmission candidate subframe of a sounding reference signal used to measure uplink reception quality, a first transmission format to all the plurality of subframes and setting, if the plurality of subframes include the transmission candidate subframe, a second transmission format to all the plurality of subframes, and receiving the repetition signals using the set transmission format.

An aspect of the present disclosure is effective for a mobile communication system.

What is claimed is:

1. An integrated circuit comprising:
control circuitry which, in operation, controls:
transmitting a physical uplink control channel (PUCCH) repetition signal including a plurality of PUCCH signals in a first sounding reference signal (SRS) transmission candidate subframe and a second SRS transmission candidate subframe; and
transmitting a SRS in the first SRS transmission candidate subframe and no SRS in the second SRS transmission candidate subframe,
wherein a shortened PUCCH format is used for transmitting the plurality of PUCCH signals in both of the first SRS transmission candidate subframe and the second SRS transmission candidate subframe, and
the first SRS transmission candidate subframe and the second SRS transmission candidate subframe are consecutive subframes; and
at least one output, which is coupled to the control circuitry and which, in operation, outputs a signal.

2. The integrated circuit according to claim 1,
wherein the first SRS transmission candidate subframe and the second SRS transmission candidate subframe are signaled by a base station.

3. The integrated circuit according to claim 1,
wherein both of the first SRS transmission candidate subframe and the second SRS transmission candidate subframe include two slots.

4. The integrated circuit according to claim 3,
wherein the shortened PUCCH format is used for transmitting the plurality of PUCCH signals in both of the two slots of the first SRS transmission candidate subframe and the second SRS transmission candidate subframe.

5. The integrated circuit according to claim 1,
wherein the control circuitry controls transmitting the PUCCH repetition signal in a Machine Type Communication (MTC) coverage enhancement mode.

6. An integrated circuit embodying logic which, when executed by a transmission apparatus, controls the transmission apparatus to perform:
transmitting a physical uplink control channel (PUCCH) repetition signal including a plurality of PUCCH signals in a first sounding reference signal (SRS) transmission candidate subframe and a second SRS transmission candidate subframe; and
transmitting a SRS in the first SRS transmission candidate subframe and no SRS in the second SRS transmission candidate subframe,
wherein a shortened PUCCH format is used for transmitting the plurality of PUCCH signals in both of the first SRS transmission candidate subframe and the second SRS transmission candidate subframe, and
the first SRS transmission candidate subframe and the second SRS transmission candidate subframe are consecutive subframes.

7. The integrated circuit according to claim 6,
wherein the first SRS transmission candidate subframe and the second SRS transmission candidate subframe are signaled by a base station.

8. The integrated circuit according to claim 6,
wherein both of the first SRS transmission candidate subframe and the second SRS transmission candidate subframe include two slots.

9. The integrated circuit according to claim 8,
wherein the shortened PUCCH format is used for transmitting the plurality of PUCCH signals in both of the two slots of the first SRS transmission candidate subframe and the second SRS transmission candidate subframe.

10. The integrated circuit according to claim 6,
wherein the PUCCH repetition signal is transmitted in a Machine Type Communication (MTC) coverage enhancement mode.

* * * * *